(12) United States Patent
Kizaki et al.

(10) Patent No.: US 11,926,750 B2
(45) Date of Patent: Mar. 12, 2024

(54) INK COMPOSITION AND METHOD FOR PRODUCING THE SAME, LIGHT CONVERSION LAYER, AND COLOR FILTER

(71) Applicant: DIC Corporation, Tokyo (JP)

(72) Inventors: Takeo Kizaki, Sakura (JP); Minoru Tabuchi, Sakura (JP); Mariko Toshimitsu, Sakura (JP); Sunao Yoshihara, Sakura (JP); Ikuro Kiyoto, Sakura (JP)

(73) Assignee: DIC CORPORATION, Tokyo (JP)

( * ) Notice: Subject to any disclaimer, the term of this patent is extended or adjusted under 35 U.S.C. 154(b) by 506 days.

(21) Appl. No.: 16/761,943

(22) PCT Filed: Oct. 25, 2018

(86) PCT No.: PCT/JP2018/039640
§ 371 (c)(1),
(2) Date: Oct. 1, 2020

(87) PCT Pub. No.: WO2019/093140
PCT Pub. Date: May 16, 2019

(65) Prior Publication Data
US 2021/0009826 A1    Jan. 14, 2021

(30) Foreign Application Priority Data
Nov. 10, 2017   (JP) ................. 2017-217320

(51) Int. Cl.
*C09D 11/037*    (2014.01)
*C09D 11/107*    (2014.01)
(Continued)

(52) U.S. Cl.
CPC .......... *C09D 11/322* (2013.01); *C09D 11/037* (2013.01); *C09D 11/107* (2013.01); *C09D 11/38* (2013.01); *G02B 5/223* (2013.01)

(58) Field of Classification Search
CPC ..... C09D 11/037; C09D 11/38; C09D 11/107; C09D 11/322; G02B 5/223
See application file for complete search history.

(56) References Cited

U.S. PATENT DOCUMENTS

2008/0070153 A1    3/2008   Ioku et al.
2016/0011506 A1    1/2016   Gu et al.
(Continued)

FOREIGN PATENT DOCUMENTS

JP    2017-129849 A    7/2017
JP    2017-201386 A    11/2017
(Continued)

OTHER PUBLICATIONS

International Search Report dated Jan. 22, 2019, issued in counterpart application No. PCT/JP2018/039640 (2 pages).

*Primary Examiner* — Bijan Ahvazi
(74) *Attorney, Agent, or Firm* — WHDA, LLP

(57) ABSTRACT

There is provided an ink composition that can form a color filter pixel unit with high external quantum efficiency. An ink composition containing light-emitting nanocrystal particles, light-diffusing particles, and at least two monomers with an ethylenically unsaturated group, wherein the at least two monomers include two monomers with Hansen solubility parameters $\delta d$, $\delta p$, and $\delta h$ that satisfy the following conditions: $16.0\ \text{MPa}^{0.5} \leq \delta d < 18.0\ \text{MPa}^{0.5}$; $2.5\ \text{MPa}^{0.5} \leq \delta p < 5.5\ \text{MPa}^{0.5}$; $2.5\ \text{MPa}^{0.5} \leq \delta h < 8.0\ \text{MPa}^{0.5}$.

16 Claims, 1 Drawing Sheet

(51) Int. Cl.
*C09D 11/322* (2014.01)
*C09D 11/38* (2014.01)
*G02B 5/22* (2006.01)

(56) References Cited

U.S. PATENT DOCUMENTS

| | | | |
|---|---|---|---|
| 2016/0215212 A1* | 7/2016 | Lee | G02B 5/201 |
| 2017/0205664 A1* | 7/2017 | Cho | G02F 1/133528 |
| 2017/0252971 A1* | 9/2017 | Umebayashi | C09D 11/40 |
| 2017/0362502 A1 | 12/2017 | Lee et al. | |
| 2019/0292453 A1 | 9/2019 | Yonemoto | |

FOREIGN PATENT DOCUMENTS

| | | | | |
|---|---|---|---|---|
| KR | 10-2016-0084619 A | 7/2016 | | |
| KR | 20160091523 A | 8/2016 | | |
| WO | 2008/001693 A1 | 1/2008 | | |
| WO | 2008/032630 A1 | 3/2008 | | |
| WO | 2015/019941 A1 | 2/2015 | | |
| WO | WO-2015019941 A1 * | 2/2015 | | C08F 2/44 |
| WO | 2018/101348 A1 | 6/2018 | | |

* cited by examiner

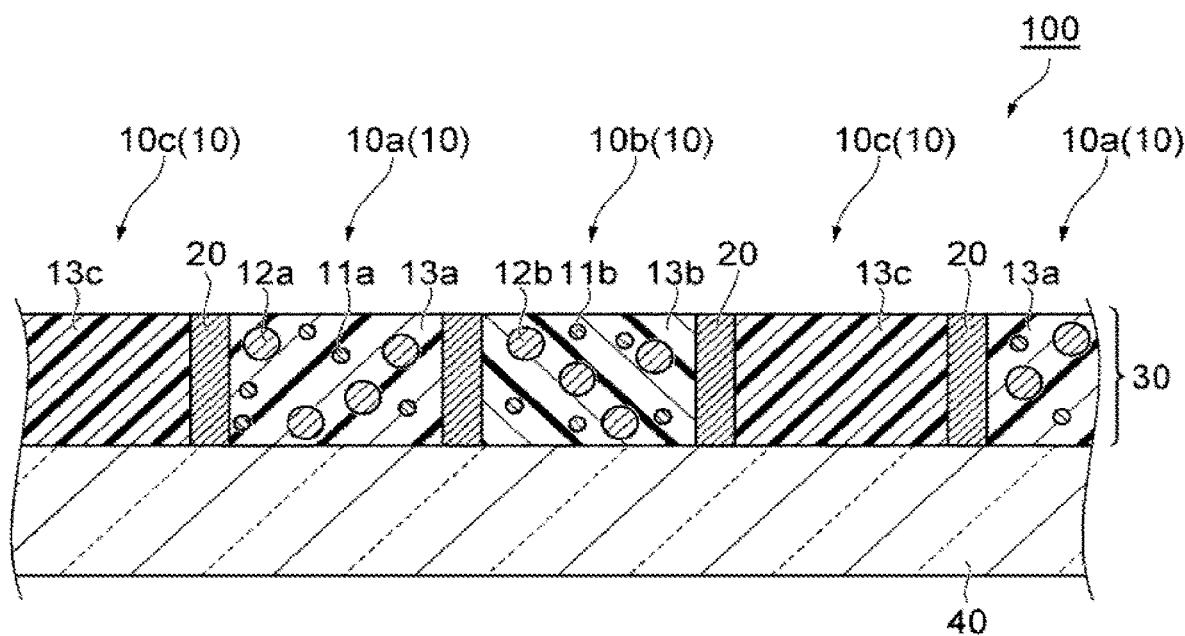

INK COMPOSITION AND METHOD FOR PRODUCING THE SAME, LIGHT CONVERSION LAYER, AND COLOR FILTER

TECHNICAL FIELD

The present invention relates to an ink composition, a method for producing the ink composition, a light conversion layer, and a color filter.

BACKGROUND TECHNOLOGY

Color filter pixel units of displays, such as liquid crystal displays, have been produced, for example, by photolithography from curable resist materials containing red organic pigment particles or green organic pigment particles and alkali-soluble resins and/or acrylic monomers.

With recent strong demands for displays with lower power consumption, a method for forming a color filter pixel unit, such as red pixels or green pixels, has been actively studied, for example, using light-emitting nanocrystal particles, such as quantum dots, quantum rods, or other inorganic fluorescent particles, instead of the red organic pigment particles or green organic pigment particles.

Due to the characteristics of such a method for producing a color filter by photolithography, however, the production method has the drawback of wasting resist materials other than pixel units including relatively expensive light-emitting nanocrystal particles. Under such circumstances, to avoid such a waste of resist materials, the formation of a pixel unit of a light conversion substrate by an ink jet method is beginning to be studied (Patent Literature 1).

CITATION LIST

Patent Literature

PTL 1: International Publication No. 2008/001693

SUMMARY OF INVENTION

Technical Problem

From the perspective of lower power consumption, there is a demand for further improved external quantum efficiency (EQE) in a color filter pixel unit (hereinafter also referred to simply as a "pixel unit") formed from an ink composition containing light-emitting nanocrystal particles.

Accordingly, it is an object of the present invention to provide an ink composition that can form a color filter pixel unit with high external quantum efficiency, a method for producing the ink composition, and a light conversion layer and a color filter each produced by using the ink composition.

Solution of Problem

One aspect of the present invention is an ink composition including light-emitting nanocrystal particles, light-diffusing particles, and at least two monomers with an ethylenically unsaturated group, wherein the ink composition includes two monomers with Hansen solubility parameters δd, δp, and δh that satisfy the following conditions.

$16.0 \text{ MPa}^{0.5} \leq \delta d < 18.0 \text{ MPa}^{0.5}$ $2.5 \text{ MPa}^{0.5} \leq \delta p < 5.5 \text{ MPa}^{0.5}$ $2.5 \text{ MPa}^{0.5} \leq \delta h < 8.0 \text{ MPa}^{0.5}$ The ink composition has good miscibility between the two monomers and can improve the external quantum efficiency of pixel units. Furthermore, the ink composition can easily have both high ejection stability and high curability.

One of the two monomers that satisfy the conditions may have a viscosity in the range of 2 to 40 mPa·s at 23° C., and the other monomer may have a viscosity in the range of 5 to 65 mPa·s at 23° C.

The two monomers that satisfy the conditions may have no vinyl ether group.

The light-emitting nanocrystal particles may have an organic ligand on their surfaces.

The ink composition may further contain a photopolymerization initiator.

The ink composition may further contain a polymer dispersant. The polymer dispersant may have a weight-average molecular weight of 1000 or more.

The at least two monomers may be alkali-insoluble.

The ink composition may form an alkali-insoluble coating film.

The light-diffusing particles may have an average particle size in the range of 0.05 to 1.0 μm.

The light-diffusing particles may contain at least one selected from the group consisting of titanium oxide, alumina, zirconium oxide, zinc oxide, calcium carbonate, barium sulfate, and barium titanate.

The ink composition may have a surface tension in the range of 20 to 40 mN/m.

The ink composition may have a viscosity in the range of 5 to 40 mPa·s at 23° C.

The ink composition may be used in a color filter.

The ink composition may be an ink composition for use in an ink jet method (an ink jet ink).

One aspect of the present invention relates to a light conversion layer including a plurality of pixel units, wherein the plurality of pixel units have a pixel unit containing a cured product of the ink composition. The pixel units of the light conversion layer have high external quantum efficiency.

The light conversion layer may further include a light-shielding portion between the plurality of pixel units, wherein the plurality of pixel units contain a first pixel unit that contains the cured product and contains, as the light-emitting nanocrystal particles, light-emitting nanocrystal particles that absorb light with a wavelength in the range of 420 to 480 nm and emit light with an emission peak wavelength in the range of 605 to 665 nm, and a second pixel unit that contains the cured product and contains, as the light-emitting nanocrystal particles, light-emitting nanocrystal particles that absorb light with a wavelength in the range of 420 to 480 nm and emit light with an emission peak wavelength in the range of 500 to 560 nm.

The plurality of pixel units may further include a third pixel unit with a light transmittance of 30% or more at a wavelength in the range of 420 to 480 nm.

One aspect of the present invention relates to a color filter including the light conversion layer. The pixel units of the color filter have high external quantum efficiency.

One aspect of the present invention relates to a method for producing the ink composition, which includes the steps of preparing a light-emitting nanocrystal particle dispersion that contains light-emitting nanocrystal particles and a first monomer containing one of the two monomers that satisfy the conditions, preparing a light-diffusing particle dispersion that contains light-diffusing particles and a second monomer containing the other of the two monomers that satisfy the conditions, and mixing the light-emitting nanocrystal particle dispersion with the light-diffusing particle dispersion. This production method can provide an ink composition that can form a color filter pixel unit with high external quantum efficiency.

Advantageous Effects of Invention

The present invention aims to provide an ink composition that can form a color filter pixel unit with high external quantum efficiency, a method for producing the ink composition, and a light conversion layer and a color filter each produced by using the ink composition.

BRIEF DESCRIPTION OF DRAWING

FIG. 1 is a schematic cross-sectional view of a color filter according to an embodiment of the present invention.

DESCRIPTION OF EMBODIMENTS

<Ink Composition>

An ink composition contains light-emitting nanocrystal particles, light-diffusing particles, and at least two monomers with an ethylenically unsaturated group.

In one embodiment, the at least two monomers include two monomers with Hansen solubility parameters $\delta d$, $\delta p$, and $\delta h$ that satisfy the following conditions.

$16.0 \text{ MPa}^{0.5} \leq \delta d < 18.0 \text{ MPa}^{0.5}$ $2.5 \text{ MPa}^{0.5} \leq \delta p < 5.5 \text{ MPa}^{0.5}$ $2.5 \text{ MPa}^{0.5} \leq \delta h < 8.0 \text{ MPa}^{0.5}$ The ink composition has good miscibility between the two monomers and can improve the external quantum efficiency of pixel units. Furthermore, the ink composition can easily have both high ejection stability and high curability.

In one embodiment, the at least two monomers include at least one combination selected from the group consisting of a monofunctional monomer and a bifunctional monomer, a monofunctional monomer and a trifunctional monomer, a bifunctional monomer and a bifunctional monomer, and a bifunctional monomer and a trifunctional monomer. The monofunctional monomer refers to a monomer with one ethylenically unsaturated group, the bifunctional monomer refers to a monomer with two ethylenically unsaturated groups, and the trifunctional monomer refers to a monomer with three ethylenically unsaturated groups. This ink composition can improve the external quantum efficiency of pixel units. Furthermore, the ink composition can easily have both high ejection stability and high curability.

For example, an ink composition according to an embodiment is an ink composition for use in a color filter, which is used to form a pixel unit of the color filter by photolithography, by an ink jet method, or by another method.

When a known ink composition is used to form a color filter pixel unit by an ink jet method, it is difficult to achieve both high ejection stability and high curability. Thus, it is more difficult to produce a color filter pixel unit with high external quantum efficiency by the ink jet method. By contrast, an ink composition according to an embodiment can provide a color filter pixel unit with high external quantum efficiency even by the ink jet method.

An ink composition according to an embodiment can be used as an ink for use in a method for producing a traditional color filter. To avoid waste of materials, such as relatively expensive light-emitting nanocrystal particles and a solvent, and to use only a required amount of the ink composition in a required portion to form a color filter pixel unit (a light conversion layer), preferably, the ink composition is appropriately prepared to be suitable for an ink jet method rather than for photolithography. Thus, an ink composition according to an embodiment is suitable to form a color filter pixel unit by an ink jet method.

A color filter ink composition for use in an ink jet method (a color filter ink jet ink) is described below by way of example. The color filter ink jet ink contains light-emitting nanocrystal particles, light-diffusing particles, a monomer with an ethylenically unsaturated group (hereinafter also referred to as an "ethylenically unsaturated monomer"), and a photopolymerization initiator.

[Light-Emitting Nanocrystal Particles]

Light-emitting nanocrystal particles are nanoscale crystals that absorb excitation light and emit fluorescence or phosphorescence, and are crystals that have a maximum particle size of 100 nm or less measured, for example, with a transmission electron microscope or a scanning electron microscope.

For example, light-emitting nanocrystal particles can absorb light with a specified wavelength and emit light with a wavelength different from the absorption wavelength (fluorescence or phosphorescence). Light-emitting nanocrystal particles may be red-light-emitting nanocrystal particles, which emit light with an emission peak wavelength in the range of 605 to 665 nm (red light), green-light-emitting nanocrystal particles, which emit light with an emission peak wavelength in the range of 500 to 560 nm (green light), or blue-light-emitting nanocrystal particles, which emit light with an emission peak wavelength in the range of 420 to 480 nm (blue light). An ink composition preferably contains at least one type of these light-emitting nanocrystal particles. Light absorbed by light-emitting nanocrystal particles may be light with a wavelength in the range of 400 nm or more and less than 500 nm (blue light) or light with a wavelength in the range of 200 to 400 nm (ultraviolet light), for example. The emission peak wavelength of light-emitting nanocrystal particles can be determined in a fluorescence spectrum or a phosphorescence spectrum measured with a spectrofluorophotometer, for example.

The red-light-emitting nanocrystal particles preferably have an emission peak wavelength of 665 nm or less, 663 nm or less, 660 nm or less, 658 nm or less, 655 nm or less, 653 nm or less, 651 nm or less, 650 nm or less, 647 nm or less, 645 nm or less, 643 nm or less, 640 nm or less, 637 nm or less, 635 nm or less, 632 nm or less, or 630 nm or less, and preferably have an emission peak wavelength of 628 nm or more, 625 nm or more, 623 nm or more, 620 nm or more, 615 nm or more, 610 nm or more, 607 nm or more, or 605 nm or more. Any of these upper limits and lower limits may be combined. Also in the following similar description, any of each upper limit and each lower limit may be combined.

The green-light-emitting nanocrystal particles preferably have an emission peak wavelength of 560 nm or less, 557 nm or less, 555 nm or less, 550 nm or less, 547 nm or less, 545 nm or less, 543 nm or less, 540 nm or less, 537 nm or less, 535 nm or less, 532 nm or less, or 530 nm or less, and preferably have an emission peak wavelength of 528 nm or more, 525 nm or more, 523 nm or more, 520 nm or more, 515 nm or more, 510 nm or more, 507 nm or more, 505 nm or more, 503 nm or more, or 500 nm or more.

The blue-light-emitting nanocrystal particles preferably have an emission peak wavelength of 480 nm or less, 477 nm or less, 475 nm or less, 470 nm or less, 467 nm or less, 465 nm or less, 463 nm or less, 460 nm or less, 457 nm or less, 455 nm or less, 452 nm or less, or 450 nm or less, and preferably have an emission peak wavelength of 450 nm or more, 445 nm or more, 440 nm or more, 435 nm or more, 430 nm or more, 428 nm or more, 425 nm or more, 422 nm or more, or 420 nm or more.

The wavelength (emission color) of light emitted by light-emitting nanocrystal particles depends on the energy gap of the light-emitting nanocrystal particles as well as the size (for example, particle size) of the light-emitting nanocrystal particles according to the solution of the Schrodinger wave equation of a potential well model. Thus, the constituent material and size of light-emitting nanocrystal particles to be used can be changed to determine the emission color.

The light-emitting nanocrystal particles may be light-emitting nanocrystal particles containing a semiconductor material (light-emitting semiconductor nanocrystal particles). The light-emitting semiconductor nanocrystal particles may be quantum dots or quantum rods. Among these, quantum dots are preferred in terms of emission spectrum controllability, reduced production costs with consistent reliability, and improved mass productivity.

The light-emitting semiconductor nanocrystal particles may be composed entirely of a core containing a first semiconductor material or may be composed of a core containing the first semiconductor material and a shell containing a second semiconductor material, which is different from the first semiconductor material, the shell covering at least part of the core. In other words, the light-emitting semiconductor nanocrystal particles may have a structure composed entirely of a core (a core structure) or composed of a core and a shell (a core/shell structure). Alternatively, the light-emitting semiconductor nanocrystal particles may further have a shell containing a third semiconductor material different from the first and second semiconductor materials (a second shell) in addition to the shell containing the second semiconductor material (a first shell), the second shell covering at least part of the core. In other words, the light-emitting semiconductor nanocrystal particles may have a structure composed of the core, the first shell, and the second shell (a core/shell/shell structure). Each of the core and the shells may be formed of mixed crystals containing two or more semiconductor materials (for example, CdSe+CdS, CIS+ZnS, etc.).

The light-emitting nanocrystal particles preferably contain, as a semiconductor material, at least one semiconductor material selected from the group consisting of group II-VI semiconductors, group III-V semiconductors, group semiconductors, group IV semiconductors, and group I-II-IV-VI semiconductors.

Specific examples of the semiconductor materials include CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AlN, Alp, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe; Si, Ge, SiC, SiGe, $AgInSe_2$, $CuGaSe_2$, $CuInS_2$, $CuGaS_2$, $CuInSe_2$, $AgInS_2$, $AgGaSe_2$, $AgGaS_2$, C, Si, and Ge. The light-emitting semiconductor nanocrystal particles preferably contain at least one selected from the group consisting of CdS, CdSe, CdTe, ZnS, ZnSe, ZnTe, ZnO, HgS, HgSe, HgTe, InP, InAs, InSb, GaP, GaAs, GaSb, $AgInS_2$, $AgInSe_2$, $AgInTe_2$, $AgGaS_2$, $AgGaSe_2$, $AgGaTe_2$, $CuInS_2$, $CuInSe_2$, $CuInTe_2$, $CuGaS_2$, $CuGaSe_2$, $CuGaTe_2$, Si, C, Ge, and $Cu_2ZnSnS_4$, in terms of emission spectrum controllability, reduced production costs with consistent reliability, and improved mass productivity.

Examples of red-light-emitting semiconductor nanocrystal particles include CdSe nanocrystal particles, nanocrystal particles having a core/shell structure with a CdS shell and a CdSe inner core, nanocrystal particles having a core/shell structure with a CdS shell and a ZnSe inner core, nanocrystal particles of mixed crystals of CdSe and ZnS, InP nanocrystal particles, nanocrystal particles having a core/shell structure with a ZnS shell and an InP inner core, nanocrystal particles having a core/shell structure with a shell formed of mixed crystals of ZnS and ZnSe and with an InP inner core, nanocrystal particles of mixed crystals of CdSe and CdS, nanocrystal particles of mixed crystals of ZnSe and CdS, nanocrystal particles having a core/shell/shell structure with a ZnSe first shell, a ZnS second shell, and an InP inner core, and nanocrystal particles having a core/shell/shell structure with a first shell formed of mixed crystals of ZnS and ZnSe, with a ZnS second shell, and with an InP inner core.

Examples of green-light-emitting semiconductor nanocrystal particles include CdSe nanocrystal particles, nanocrystal particles of mixed crystals of CdSe and ZnS, nanocrystal particles having a core/shell structure with a ZnS shell and an InP inner core, nanocrystal particles having a core/shell structure with a shell formed of mixed crystals of ZnS and ZnSe and with an InP inner core, nanocrystal particles having a core/shell/shell structure with a ZnSe first shell, a ZnS second shell, and an InP inner core, and nanocrystal particles having a core/shell/shell structure with a first shell formed of mixed crystals of ZnS and ZnSe, with a ZnS second shell, and with an InP inner core.

Examples of blue-light-emitting semiconductor nanocrystal particles include ZnSe nanocrystal particles, ZnS nanocrystal particles, nanocrystal particles having a core/shell structure with a ZnSe shell and a ZnS inner core, CdS nanocrystal particles, nanocrystal particles having a core/shell structure with a ZnS shell and an InP inner core, nanocrystal particles having a core/shell structure with a shell formed of mixed crystals of ZnS and ZnSe and with an InP inner core, nanocrystal particles having a core/shell/shell structure with a ZnSe first shell, a ZnS second shell, and an InP inner core, and nanocrystal particles having a core/shell/shell structure with a first shell formed of mixed crystals of ZnS and ZnSe, with a ZnS second shell, and with an InP inner core. The color of light emitted by semiconductor nanocrystal particles with a fixed chemical composition can be altered to red or green by changing the average particle size of the semiconductor nanocrystal particles. Semiconductor nanocrystal particles by themselves preferably have minimal adverse effects on human bodies. When semiconductor nanocrystal particles containing cadmium, selenium, or the like are used as light-emitting nanocrystal particles, semiconductor nanocrystal particles containing minimal amounts of these elements (cadmium, selenium, etc.) are preferably used alone, or the semiconductor nanocrystal particles are preferably used in combination with other light-emitting nanocrystal particles to decrease the amounts of these elements.

The light-emitting nanocrystal particles may have any shape, may have any geometrical shape, and may have any irregular shape. For example, the light-emitting nanocrystal particles may be spherical, ellipsoidal, pyramid-shaped, discoid, branched, netlike, or rod-shaped. The light-emitting nanocrystal particles preferably have less directional shapes (for example, spherical, regular tetrahedral, etc.) to improve the uniformity and fluidity of the ink composition.

The light-emitting nanocrystal particles may have an average particle size (volume-average size) of 1 nm or more, 1.5 nm or more, or 2 nm or more in terms of easy light emission at a desired wavelength and high dispersibility and storage stability. The light-emitting nanocrystal particles may have an average particle size of 40 nm or less, 30 nm or less, or 20 nm or less in terms of easy light emission at a desired wavelength. The average particle size (volume-average size) of the light-emitting nanocrystal particles can be measured with a transmission electron microscope or a scanning electron microscope and can be calculated as a volume-average size.

The light-emitting nanocrystal particles preferably have an organic ligand on their surfaces in terms of dispersion stability. For example, the organic ligand may be coordinated with the surfaces of the light-emitting nanocrystal particles. In other words, the surfaces of the light-emitting nanocrystal particles may be passivated by the organic ligand. In an ink composition further containing a polymer dispersant described later, the light-emitting nanocrystal particles may have the polymer dispersant on their surfaces. For example, the organic ligand may be removed from the light-emitting nanocrystal particles having the organic ligand, and the organic ligand may be replaced with a polymer dispersant to bond the polymer dispersant to the surfaces of the light-emitting nanocrystal particles. With respect to the dispersion stability of an ink jet ink, the light-emitting nanocrystal particles coordinated with the polymer dispersant is preferred to the light-emitting nanocrystal particles coordinated with the organic ligand.

The organic ligand is preferably a compound with a functional group for ensuring affinity for an ethylenically unsaturated monomer and an organic solvent (hereinafter also referred to as simply an "affinity group") and with a functional group for ensuring adsorptivity on light-emitting nanocrystals (hereinafter also referred to simply as an "adsorption group"). The affinity group is preferably an aliphatic hydrocarbon group. The aliphatic hydrocarbon group may be linear or may have a branched structure. The aliphatic hydrocarbon group may or may not have an unsaturated bond. The adsorption group may be a hydrogen group, an amino group, a carboxy group, a thiol group, a phosphate group, a phosphonate group, a phosphine group, a phosphine oxide group, or alkoxysilyl. Examples of the organic ligand include trioctylphosphine (TOP), trioctylphosphine oxide (TOPO), oleic acid, oleylamine, octylamine, trioctylamine, hexadecylamine, octanethiol, dodecanethiol, hexylphosphonic acid (HPA), tetradecylphosphonic acid (TDPA), and octylphosphinic acid (OPA).

The organic ligand preferably has an aliphatic hydrocarbon having an ethylene oxide chain and/or a propylene oxide chain as an affinity group in terms of improved dispersion of light-emitting nanocrystal particles and higher ejection stability. More specifically, the organic ligand may be represented by the following formula (1).

[Chem. 1]

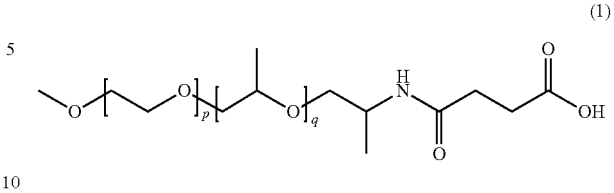

[In the formula (1), p denotes an integer in the range of 0 to 50, and q denotes an integer in the range of 0 to 50.]

In the organic ligand represented by the formula (1), at least one of p and q is preferably 1 or more, and both p and q are more preferably 1 or more.

The light-emitting nanocrystal particles may be dispersed in colloidal form in an organic solvent or in an ethylenically unsaturated monomer. The surfaces of the light-emitting nanocrystal particles dispersed in an organic solvent are preferably passivated by the organic ligand. Examples of the organic solvent include cyclohexane, hexane, heptane, chloroform, toluene, octane, chlorobenzene, tetralin, diphenyl ether, propylene glycol monomethyl ether acetate, butyl carbitol acetate, and mixtures thereof.

The light-emitting nanocrystal particles may be a commercial product. Examples of commercial products of the light-emitting nanocrystal particles include indium phosphide/zinc sulfide, D-dots, and CuInS/ZnS each manufactured by NN-Labs, and InP/ZnS manufactured by Aldrich.

The light-emitting nanocrystal particle content is preferably 5% or more by mass of the mass of the non-volatile matter of the ink composition in terms of the enhanced effect of improving external quantum efficiency. A light-emitting nanocrystal particle content of 5% or more by mass results in high emission intensity, and such an ink composition is suitable for color filter applications. From the same perspective, the light-emitting nanocrystal particle content may be 10% or more by mass, 15% or more by mass, or 20% or more by mass of the mass of the non-volatile matter of the ink composition. The light-emitting nanocrystal particle content is preferably 50% or less by mass of the mass of the non-volatile matter of the ink composition in terms of higher ejection stability. A light-emitting nanocrystal particle content of 50% or less by mass results in high emission intensity, and such an ink composition is suitable for color filter applications. From the same perspective, the light-emitting nanocrystal particle content may be 40% or less by mass, 35% or less by mass, or 30% or less by mass of the mass of the non-volatile matter of the ink composition. The light-emitting nanocrystal particle content may range from 5% to 50% by mass, 10% to 50% by mass, 15% to 40% by mass, 15% to 35% by mass, 20% to 35% by mass, or 20% to 30% by mass of the mass of the non-volatile matter of the ink composition. The term "the mass of the non-volatile matter of the ink composition", as used herein, refers to the total mass of the ink composition excluding the mass of solvent when the ink composition contains the solvent, or the total mass of the ink composition when the ink composition contains no solvent.

The ink composition may contain, as light-emitting nanocrystal particles, two or more types of red-light-emitting nanocrystal particles, green-light-emitting nanocrystal particles, and blue-light-emitting nanocrystal particles and preferably contains only one type of these particles. When the light-emitting nanocrystal particles contain red-light-emitting nanocrystal particles, the green-light-emitting nanocrystal particle content and the blue-light-emitting nanocrystal particle content are preferably 10% or less by mass, more preferably 0% by mass, of the total mass of the light-emitting nanocrystal particles. When the light-emitting nanocrystal particles contain green-light-emitting nanocrystal particles, the red-light-emitting nanocrystal particle content and the blue-light-emitting nanocrystal particle content are preferably 10% or less by mass, more preferably 0% by mass, of the total mass of the light-emitting nanocrystal particles.

[Light-Diffusing Particles]

For example, the light-diffusing particles are optically inactive inorganic fine particles. The light-diffusing particles can scatter light emitted toward a color filter pixel unit from a light source.

Examples of materials constituting the light-diffusing particles include metal elements, such as tungsten, zirconium, titanium, platinum, bismuth, rhodium, palladium, silver, tin, platinum, and gold; metal oxides, such as silica, barium sulfate, barium carbonate, calcium carbonate, talc, clay, kaolin, barium sulfate, barium carbonate, calcium carbonate, white fused alumina, titanium oxide, magnesium oxide, barium oxide, aluminum oxide, bismuth oxide, zirconium oxide, and zinc oxide; metal carbonates, such as magnesium carbonate, barium carbonate, bismuth subcarbonate, and calcium carbonate; metal hydroxides, such as aluminum hydroxide; composite oxides, such as barium zirconate, calcium zirconate, calcium titanate, barium titanate, and strontium titanate, and metal salts, such as bismuth subnitrate. In terms of improved ejection stability and the enhanced effect of improving external quantum efficiency, the light-diffusing particles preferably contain at least one selected from the group consisting of titanium oxide, alumina, zirconium oxide, zinc oxide, calcium carbonate, barium sulfate, and barium titanate, more preferably at least one selected from the group consisting of titanium oxide, zirconium oxide, zinc oxide, and barium titanate.

The shape of the light-diffusing particles may be spherical, filamentary, or amorphous. The light-diffusing particles preferably have less directional shapes (for example, spherical, regular tetrahedral, etc.) to improve the uniformity, fluidity, and light-diffusing of the ink composition and to improve the ejection stability.

The light-diffusing particles in the ink composition may have an average particle size (volume-average size) of 0.05 μm or more, 0.2 μm or more, or 0.3 μm or more in terms of improved ejection stability and the enhanced effect of improving external quantum efficiency. The average particle size (volume-average size) of the light-diffusing particles in the ink composition may be 1.0 μm or less, 0.6 μm or less, or 0.4 μm or less in terms of high ejection stability. The average particle size (volume-average size) of the light-diffusing particles in the ink composition may range from 0.05 to 1.0 μm, 0.05 to 0.6 μm, 0.05 to 0.4 μm, 0.2 to 1.0 μm, 0.2 to 0.6 μm, 0.2 to 0.4 μm, 0.3 to 1.0 μm, 0.3 to 0.6 μm, or 0.3 to 0.4 μm. To easily achieve such an average particle size (volume-average size), the average particle size (volume-average size) of the light-diffusing particles to be used may be 50 nm or more and may be 1000 nm or less. The average particle size (volume-average size) of the light-diffusing particles in the ink composition can be measured with a dynamic light-diffusing Nanotrac particle size distribution analyzer and can be calculated as a volume-average size. The average particle size (volume-average size) of the light-diffusing particles to be used can be determined, for example, by measuring the particle size of each particle with a transmission electron microscope or a scanning electron microscope and calculating the volume-average size.

In terms of the enhanced effect of improving external quantum efficiency, the light-diffusing particle content may be 0.1% or more by mass, 1% or more by mass, 5% or more by mass, 7% or more by mass, 10% or more by mass, or 12% or more by mass of the mass of the non-volatile matter of the ink composition. In terms of high ejection stability and the enhanced effect of improving external quantum efficiency, the light-diffusing particle content may be 60% or less by mass, 50% or less by mass, 40% or less by mass, 30% or less by mass, 25% or less by mass, 20% or less by mass, or 15% or less by mass of the mass of the non-volatile matter of the ink composition. When the ink composition contains a polymer dispersant, the light-diffusing particles can be uniformly dispersed even at the light-diffusing particle content in the above range.

The mass ratio of the light-diffusing particle content to the light-emitting nanocrystal particle content (light-diffusing particles/light-emitting nanocrystal particles) may be 0.1 or more, 0.2 or more, or 0.5 or more in terms of the enhanced effect of improving external quantum efficiency. The mass ratio (light-diffusing particles/light-emitting nanocrystal particles) may be 5.0 or less, 2.0 or less, or 1.5 or less in terms of the enhanced effect of improving external quantum efficiency and good continuous ejectability during ink jet printing (ejection stability). The light-diffusing particles probably improve the external quantum efficiency by the following mechanism. In the absence of the light-diffusing particles, backlight only travels straight through a pixel unit and is less likely to be absorbed by the light-emitting nanocrystal particles. By contrast, in the presence of the light-diffusing particles in a pixel unit containing the light-emitting nanocrystal particles, backlight is scattered in all directions in the pixel unit and can be received by the light-emitting nanocrystal particles, thus resulting in increased light absorption in the pixel unit even using the same backlight. Consequently, such a mechanism can prevent leakage light (light from a light source not absorbed by the light-emitting nanocrystal particles and leaking from the pixel unit) and improve the external quantum efficiency.

[Ethylenically Unsaturated Monomer]

The ethylenically unsaturated monomer is a photopolymerizable compound that is used in combination with a photopolymerization initiator and that is polymerized by light irradiation. In the present embodiment, at least two different monomers are used in combination as ethylenically unsaturated monomers. The at least two monomers may include two monomers with Hansen solubility parameters δd, δp, and δh that satisfy the following conditions, and may include at least one combination selected from the group consisting of a monofunctional monomer and a bifunctional monomer, a monofunctional monomer and a trifunctional monomer, a bifunctional monomer and a bifunctional monomer, and a bifunctional monomer and a trifunctional monomer.

$$16.0 \text{ MPa}^{0.5} \leq \delta d < 18.0 \text{ MPa}^{0.5}$$

$$2.5 \text{ MPa}^{0.5} \leq \delta p < 5.5 \text{ MPa}^{0.5}$$

$$2.5 \text{ MPa}^{0.5} \leq \delta h < 8.0 \text{ MPa}^{0.5}$$

The Hansen solubility parameters are the Hildebrand solubility parameters divided into three components δd, δp, and δh and represented in the three-dimensional space. δd denotes the nonpolar interaction effect, δp denotes the dipole-dipole force effect, and δh denotes the hydrogen bond strength effect. The Hansen solubility parameters of various monomers are described in Charles M. Hansen, "Hansen Solubility Parameters: A Users Handbook", for example. The Hansen solubility parameters of monomers not described can be estimated using computer software (Hansen Solubility Parameters in Practice (HSPiP)).

The two monomers may have δd of 17.5 MPa$^{0.5}$ or less, 17.0 MPa$^{0.5}$ or less, or 16.5 MPa$^{0.5}$ or less in terms of higher external quantum efficiency. The two monomers may have δp of 3.0 MPa$^{0.5}$ or more or 4.0 MPa$^{0.5}$ or more in terms of higher external quantum efficiency. The two monomers may have δh of 4.0 MPa$^{0.5}$ or more or 7.0 MPa$^{0.5}$ or less in terms of higher external quantum efficiency.

When the ink composition contains three or more ethylenically unsaturated monomers, it is desirable that all the ethylenically unsaturated monomers have the Hansen solubility parameters δd, δp, and δh that satisfy the conditions. The ink composition may further contain an ethylenically unsaturated monomer other than the monomers with the Hansen solubility parameters δd, δp, and δh that satisfy the conditions.

The two monomers constituting the combination are preferably miscible with each other. More specifically, the Hansen solubility parameters (HSP) δd (dispersion term), δp (polarity term), and δh (hydrogen bonding term) of one of the monomers and the Hansen solubility parameters (HSP) δd (dispersion term), δp (polarity term), and δh (hydrogen bonding term) of the other monomer preferably satisfy the following conditions.

$$16.0 \text{ MPa}^{0.5} \leq \delta d < 18.0 \text{ MPa}^{0.5}$$

$$2.5 \text{ MPa}^{0.5} \leq \delta p < 5.5 \text{ MPa}^{0.5}$$

$$2.5 \text{ MPa}^{0.5} \leq \delta h < 8.0 \text{ MPa}^{0.5}$$

In other words, the at least two monomers with an ethylenically unsaturated group preferably include, as two monomers constituting the combination, two monomers with the Hansen solubility parameters δd, δp, and δh that satisfy the conditions. When the Hansen solubility parameters δd, δp, and δh of the two monomers constituting the combination satisfy the conditions, the monomers have good miscibility with each other, and the external quantum efficiency tends to be further improved.

Ethylenically unsaturated monomers refer to monomers with an ethylenically unsaturated bond (a carbon-carbon double bond). Examples of the ethylenically unsaturated monomers include monomers with a functional group including an ethylenically unsaturated group, such as a vinyl group, a vinylene group, or a vinylidene group. Monomers with these functional groups are sometimes collectively referred to as "vinyl monomers".

The functional group including an ethylenically unsaturated group may be a vinyl group, a vinylene group, a vinylidene group, or a (meth)acryloyl group. A preferred functional group including an ethylenically unsaturated group is a (meth)acryloyl group in terms of the enhanced effect of improving external quantum efficiency. Thus, a (meth)acrylate is preferably used as an ethylenically unsaturated monomer. More specifically, the two monomers that satisfy the conditions (the conditions for the Hansen solubility parameters δd, δp, and δh) are preferably (meth)acrylates, and the two monomers constituting the above combination (at least one combination selected from the group consisting of a monofunctional monomer and a bifunctional monomer, a monofunctional monomer and a trifunctional monomer, a bifunctional monomer and a bifunctional monomer, and a bifunctional monomer and a trifunctional monomer) are preferably (meth)acrylates. When the at least two monomers include two or more of the combinations, two monomers constituting at least one of the combinations may be (meth)acrylates, and two monomers constituting each combination may be (meth)acrylates. The term "(meth)acryloyl group", as used herein, refers to an "acryloyl group" and its corresponding "methacryloyl group". The same applies to the terms "(meth)acrylate" and "(meth)acrylamide".

The functional group including an ethylenically unsaturated group is not a (meth)acrylamide group in terms of improved ejection stability. Thus, a monomer without a (meth)acrylamide group is preferably used as an ethylenically unsaturated monomer. More specifically, two ethylenically unsaturated monomers that satisfy the conditions are preferably monomers without a (meth)acrylamide group, and the two monomers constituting the combination are preferably monomers without a (meth)acrylamide group. In terms of the ejection stability of the ink composition, the ethylenically unsaturated monomer more preferably includes no monomer with a (meth)acrylamide group, and the ink composition still more preferably includes no monomer with a (meth)acrylamide group.

The functional group including an ethylenically unsaturated group is not a vinyl ether group in terms of improved ejection stability. Thus, a monomer without a vinyl ether group is preferably used as an ethylenically unsaturated monomer. Two ethylenically unsaturated monomers that satisfy the conditions are preferably monomers without a vinyl ether group, and the two monomers constituting the combination are preferably monomers without a vinyl ether group. In particular, when the ink composition contains a compound with a carboxy group, a reaction between the carboxy group and a vinyl ether group increases the viscosity of the ink composition, thus possibly resulting in insufficient ejection stability. From such a perspective, the ethylenically unsaturated monomer more preferably includes no monomer with a vinyl ether group, and the ink composition still more preferably includes no monomer with a vinyl ether group.

The monofunctional monomer may be a mono(meth) acrylate represented by the following formula (2).

[Chem. 2]

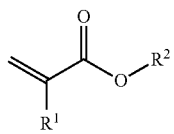

(2)

In the formula (2), $R^1$ denotes a hydrogen atom or a methyl group, and $R^2$ denotes a monovalent hydrocarbon group (other than those with an ethylenically unsaturated group). The hydrocarbon group may be linear, branched, or cyclic. In terms of high ejection stability and the enhanced effect of improving external quantum efficiency, the number of carbon atoms in the hydrocarbon group is preferably 7 or less. In other words, preferably, the monofunctional monomer is not a monomer represented by the formula (2) in which $R^2$ is a hydrocarbon group having 8 or more carbon atoms. The hydrocarbon group may be substituted and may have an ether bond, for example.

Specific examples of the monofunctional monomer include methyl (meth)acrylate, ethyl (meth)acrylate, propyl (meth)acrylate, butyl (meth)acrylate, amyl (meth)acrylate, 2-ethylhexyl (meth)acrylate, octyl (meth)acrylate, nonyl (meth)acrylate, dodecyl (meth)acrylate, hexadecyl (meth) acrylate, octadecyl (meth)acrylate, cyclohexyl (meth)acrylate, methoxyethyl (meth)acrylate, butoxyethyl (meth) acrylate, phenoxyethyl (meth) acrylate, nonylphenoxyethyl (meth)acrylate, glycidyl (meth)acrylate, dimethylaminoethyl (meth) acrylate, diethylaminoethyl (meth)acrylate, ethoxyethoxyethyl (meth)acrylate, isobornyl (meth) acrylate, dicyclopentanyl (meth) acrylate, dicyclopentenyl (meth)acrylate, dicyclopentenyloxyethyl (meth)acrylate, 2-hydroxy-3-phenoxypropyl (meth)acrylate, tetrahydrofurfuryl (meth) acrylate, 2-hydroxyethyl (meth) acrylate, benzyl (meth) acrylate, phenylbenzyl (meth)acrylate, mono(2-acryloyloxyethyl) succinate, N-[2-(acryloyloxy)ethyl] phthalimide, and N-[2-(acryloyloxy) ethyl] tetrahydrophthalimide. Among these, ethoxyethoxyethyl (meth)acrylate is preferably used.

The monofunctional monomer preferably has a viscosity of 2 mPa·s or more, 5 mPa·s or more, 7 mPa·s or more, or 35 mPa·s or more in terms of good miscibility with light-emitting nanocrystal particles, and preferably has a viscosity of 40 mPa·s or less, 30 mPa·s or less, 8 mPa·s or less, or 4 mPa·s or less in terms of improved ejection stability. In the present specification, the viscosity of a monomer with an ethylenically unsaturated group, such as a monofunctional monomer, is measured, for example, with an E-type viscometer at 23° C.

The bifunctional monomer may be a di(meth)acrylate represented by the following formula (3).

[Chem. 3]

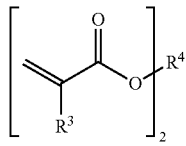

(3)

In the formula (3), $R^3$s independently denote a hydrogen atom or a methyl group, and $R^4$ denotes a divalent hydrocarbon group (other than those with an ethylenically unsaturated group). The hydrocarbon group may be linear, branched, or cyclic. In terms of high ejection stability and the enhanced effect of improving external quantum efficiency, the number of carbon atoms in the hydrocarbon group is preferably 7 or less. The hydrocarbon group may be substituted and may have an ether bond, for example.

Specific examples of the bifunctional monomer include 1,3-butylene glycol di(meth)acrylate, 1,4-butanediol di(meth)acrylate, 1,5-pentanediol di(meth)acrylate, 3-methyl-1,5-pentanediol di(meth)acrylate, 1,6-hexanediol di(meth)acrylate, neopentyl glycol di(meth)acrylate, 1,8-octanediol di(meth)acrylate, 1,9-nonanediol di(meth)acrylate, tricyclodecane dimethanol di(meth)acrylate, ethylene glycol di(meth)acrylate, poly(ethylene glycol) di(meth)acrylate, propylene glycol di(meth)acrylate, dipropylene glycol di(meth) acrylate, tripropylene glycol di(meth)acrylate, poly (propylene glycol) di(meth)acrylate, neopentyl glycol hydroxypivalate diacrylate, a di(meth)acrylate of tris(2-hydroxyethyl)isocyanurate in which two hydroxy groups are substituted with a (meth)acryloyloxy group, a di(meth) acrylate of a diol produced by the addition of 4 mol or more of ethylene oxide or propylene oxide to 1 mol of neopentyl glycol in which two hydroxy groups are substituted with a (meth)acryloyloxy group, a di(meth)acrylate of a diol produced by the addition of 2 mol of ethylene oxide or propylene oxide to 1 mol of bisphenol A in which two hydroxy groups are substituted with a (meth)acryloyloxy group, a di(meth)acrylate of a triol produced by the addition of 3 mol or more of ethylene oxide or propylene oxide to 1 mol of trimethylolpropane in which two hydroxy groups are substituted with a (meth)acryloyloxy group, and a di(meth) acrylate of a diol produced by the addition of 4 mol or more of ethylene oxide or propylene oxide to 1 mol of bisphenol A in which two hydroxy groups are substituted with a (meth)acryloyloxy group. Among these, dipropylene glycol di(meth)acrylate is preferably used.

The bifunctional monomer preferably has a viscosity of 3 mPa·s or more, 5 mPa·s or more, or 6 mPa·s or more in terms of good miscibility with light-emitting nanocrystal particles, and preferably has a viscosity of 13 mPa·s or less, 10 mPa·s or less, or 9 mPa·s or less in terms of improved ejection stability. These viscosities are viscosities at 23° C.

The trifunctional monomer may be a tri(meth)acrylate represented by the following formula (4).

[Chem. 4]

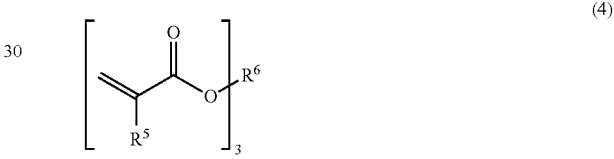

(4)

In the formula (4), $R^5$s independently denote a hydrogen atom or a methyl group, and $R^6$ denotes a trivalent hydrocarbon group (other than those with an ethylenically unsaturated group). The hydrocarbon group may be linear, branched, or cyclic. In terms of high ejection stability and the enhanced effect of improving external quantum efficiency, the number of carbon atoms in the hydrocarbon group is preferably 4 or less. The hydrocarbon group may be substituted and may have an ether bond, for example.

Specific examples of the trifunctional monomer include glycerin tri(meth)acrylate and trimethylolethane tri(meth) acrylate. Among these, glycerin tri(meth)acrylate is preferably used.

The trifunctional monomer preferably has a viscosity of 30 mPa·s or more in terms of good miscibility with light-emitting nanocrystal particles, and preferably has a viscosity of 120 mPa·s or less, 70 mPa·s or less, or 40 mPa·s or less in terms of improved ejection stability. These viscosities are viscosities at 23° C.

To produce an ink composition with high ejection stability and curability, both of the two monomers constituting the combination are preferably bifunctional monomers. More specifically, the at least two monomers with an ethylenically unsaturated group include a combination of a bifunctional monomer and a bifunctional monomer.

To produce an ink composition with high ejection stability and curability, one of the two monomers that satisfy the conditions is preferably a monomer with an ether bond, and the other of the two monomers that satisfy the conditions is preferably a monomer without an ether bond. When one of the two monomers that satisfy the conditions is a monomer with an ether bond, this tends to increase the affinity for light-emitting nanocrystal particles and further improve light-emitting properties (for example, external quantum efficiency).

To produce an ink composition with high ejection stability and curability, one of the two monomers constituting the combination is preferably a monomer with an ether bond, and the other of the two monomers constituting the combination is preferably a monomer without an ether bond. When one of the two monomers constituting the combination is a monomer with an ether bond, this tends to increase the affinity for light-emitting nanocrystal particles and further improve light-emitting properties (for example, external quantum efficiency). From such a perspective, the at least two monomers with an ethylenically unsaturated group more preferably include a combination of a bifunctional monomer with an ether bond and a bifunctional monomer without an ether bond.

To produce an ink composition with high ejection stability and curability, one of the two monomers that satisfy the conditions is preferably a methacrylate monomer. In this case, the other of the two monomers constituting the combination is more preferably an acrylate monomer. When one of the two monomers that satisfy the conditions is a methacrylate monomer, this tends to increase the affinity for light-emitting nanocrystal particles and further improve light-emitting properties (for example, external quantum efficiency). These effects tend to be significant when one of the two monomers that satisfy the conditions is a methacrylate monomer and the other of the two monomers that satisfy the conditions is an acrylate monomer.

To produce an ink composition with high ejection stability and curability, one of the two monomers constituting the combination is preferably a methacrylate monomer. In this case, the other of the two monomers constituting the combination is more preferably an acrylate monomer. When one of the two monomers constituting the combination is a methacrylate monomer, this tends to increase the affinity for light-emitting nanocrystal particles and further improve light-emitting properties (for example, external quantum efficiency). These effects tend to be significant when one of the two monomers constituting the combination is a methacrylate monomer and the other of the two monomers constituting the combination is an acrylate monomer. From such a perspective, the at least two monomers with an ethylenically unsaturated group more preferably include a combination of a dimethacrylate monomer and a diacrylate monomer.

A monomer with fewer functional groups (a monofunctional monomer or a bifunctional monomer) of the two monomers constituting the combination is hereinafter referred to as a monomer A. The monomer A preferably has a viscosity of 2 mPa·s or more, 3 mPa·s or more, 5 mPa·s or more, or 6 mPa·s or more at 23° C. in terms of improved curability, and preferably has a viscosity of 40 mPa·s or less, 6 mPa·s or less, or 4 mPa·s or less at 23° C. in terms of improved ejection stability. A monomer with more functional groups (a bifunctional monomer or a trifunctional monomer) of the two monomers constituting the combination is hereinafter referred to as a monomer B. The monomer B preferably has a viscosity of 3 mPa·s or more, 5 mPa·s or more, or 8 mPa·s or more in terms of improved dispersibility of light-diffusing particles, and preferably has a viscosity of 70 mPa·s or less, 65 mPa·s or less, 40 mPa·s or less, 15 mPa·s or less, or 10 mPa·s or less in terms of improved ejection stability. A monomer A with a viscosity in the range of 2 to 40 mPa·s at 23° C. is preferably combined with a monomer B with a viscosity in the range of 3 to 70 mPa·s at 23° C. A monomer A with a viscosity in the range of 2 to 40 mPa·s at 23° C. is more preferably combined with a monomer B with a viscosity in the range of 5 to 65 mPa·s at 23° C. When a combination of two monomers is a combination of two bifunctional monomers, preferably, one of the bifunctional monomers satisfies the viscosity of the monomer A, and the other monomer satisfies the viscosity of the monomer B.

The ethylenically unsaturated monomer may include a combination with a monomer A content being 45% or more by mass, 50% or more by mass, or 60% or more by mass of the mass of the non-volatile matter of the ink composition in terms of miscibility with light-emitting nanocrystal particles, and may include a combination with a monomer A content being 85% or less by mass, 75% or less by mass, or 65% or less by mass of the mass of the non-volatile matter of the ink composition in terms of improved external quantum efficiency. The ethylenically unsaturated monomer may include a combination with a monomer B content being 15% or more by mass, 25% or more by mass, or 35% or more by mass of the mass of the non-volatile matter of the ink composition in terms of improved curability, and may include a combination with a monomer B content being 50% or less by mass, 40% or less by mass, or 30% or less by mass of the mass of the non-volatile matter of the ink composition in terms of improved external quantum efficiency. The ethylenically unsaturated monomer may preferably include a combination of the above amount of the monomer A and the above amount of the monomer B. When a combination of two monomers is a combination of two bifunctional monomers, one of the bifunctional monomers may satisfy the monomer A content, and the other monomer may satisfy the monomer B content.

The ethylenically unsaturated monomer may include multiple types of combinations of the monomer A and the monomer B. More specifically, the ethylenically unsaturated monomer may include a combination of a monofunctional monomer, a bifunctional monomer, and a trifunctional monomer, may include a combination of two or more monofunctional monomers and a bifunctional monomer or a trifunctional monomer, and may include a combination of multiple types of trifunctional monomers and a monofunctional monomer or bifunctional monomer.

When the ink composition contains a monofunctional monomer, the monofunctional monomer content may be 45% or more by mass, 55% or more by mass, or 65% or more by mass of the mass of the non-volatile matter of the ink composition in terms of miscibility with light-emitting nanocrystal particles. The monofunctional monomer content may be 75% or less by mass, 65% or less by mass, or 55% or less by mass of the mass of the non-volatile matter of the ink composition in terms of improved curability.

When the ink composition contains a bifunctional monomer, the bifunctional monomer content may be 45% or more by mass, 55% or more by mass, or 65% or more by mass of the mass of the non-volatile matter of the ink composition in terms of miscibility with light-emitting nanocrystal particles. The bifunctional monomer content may be 100% or less by mass, 80% or less by mass, or 75% or less by mass of the mass of the non-volatile matter of the ink composition in terms of improved curability.

When the ink composition contains a trifunctional monomer, the trifunctional monomer content may be 10% or more by mass, 20% or more by mass, 25% or more by mass, or 30% or more by mass of the mass of the non-volatile matter of the ink composition in terms of improved curability. The trifunctional monomer content may be 40% or less by mass, 30% or less by mass, 25% or less by mass, or 20% or less by mass of the mass of the non-volatile matter of the ink composition in terms of ejection stability.

To easily form a reliable color filter pixel unit, the ethylenically unsaturated monomer may be alkali-insoluble. The phrase "the ethylenically unsaturated monomer is alkali-insoluble", as used herein, means that the amount of the monomer dissolved in 1% by mass aqueous potassium hydroxide at 25° C. is 30% or less by mass of the total mass of the monomer. The amount of dissolved ethylenically unsaturated monomer is preferably 10% or less by mass, more preferably 3% or less by mass.

The viscosity (viscosity at 23° C.) of the whole ethylenically unsaturated monomer is preferably 3 mPa·s or more, 5 mPa·s or more, or 8 mPa·s or more in terms of ejection stability, and 65 mPa·s or less, 35 mPa·s or less, or 25 mPa·s or less in terms of ejection stability.

To easily achieve a viscosity appropriate for an ink jet ink, to improve the curability of the ink composition, and to improve the solvent resistance and abrasion resistance of a pixel unit (a cured product of the ink composition), the ethylenically unsaturated monomer content may be 10% or more by mass, 15% or more by mass, or 20% or more by mass of the mass of the non-volatile matter of the ink composition. To easily achieve a viscosity appropriate for an ink jet ink and to improve the optical characteristics (for example, external quantum efficiency), the ethylenically unsaturated monomer content may be 90% or less by mass, 80% or less by mass, 70% or less by mass, 60% or less by mass, or 50% or less by mass of the mass of the non-volatile matter of the ink composition.

[Photopolymerization Initiator]

A radical photopolymerization initiator or a cationic photopolymerization initiator may be widely used as a photopolymerization initiator. A radical photopolymerizable compound is preferably used in terms of the storage stability of an ink composition containing light-emitting nanocrystal particles (for example, quantum dots) and in terms of low-temperature curing with less thermal degradation of quantum dots. A cationic photopolymerizable compound is preferably used in terms of the formation of a pixel unit (a cured product of the ink composition) without oxygen inhibition in the curing process.

The radical photopolymerization initiator is preferably a molecule cleavage type or hydrogen abstraction type radical photopolymerization initiator, more preferably at least one selected from the group consisting of acylphosphine oxide photopolymerization initiators and alkylphenone photopolymerization initiators.

The acylphosphine oxide photopolymerization initiators include 2,4,6-trimethylbenzoyldiphenylphosphine oxide, ethyl phenyl(2,4,6-trimethylbenzoyl)phosphinate, bis(2,6-dimethoxybenzoyl)-2,4,4-trimethylpentylphosphine oxide, and bis(2,4,6-trimethylbenzoyl)phenylphosphine oxide.

The alkylphenone photopolymerization initiators include 1-hydroxycyclohexyl phenyl ketone, 2-hydroxy-2-methyl-1-phenylpropan-1-one, 2,2-dimethoxy-1,2-diphenylethan-1-one, 2,2-dimethoxy-2-phenylacetophenone, 1-(4-isopropylphenyl)-2-hydroxy-2-methylpropan-1-one, 2-methyl-1-(4-methylthiophenyl)-2-morpholinopropan-1-one, and 2-benzyl-2-dimethylamino-1-(4-morpholinophenyl)-butan-1-one.

The molecule cleavage type radical photopolymerization initiator other than the acylphosphine oxide photopolymerization initiators and alkylphenone photopolymerization initiators may be a benzoin, such as benzoin ethyl ether or benzoin isobutyl ether, or a thioxanthone, such as 2,4-diethylthioxanthone or 2-isopropylthioxanthone.

The radical photopolymerization initiator of the hydrogen abstraction type may be benzophenone, 4-phenylbenzophenone, isophthalphenone, or 4-benzoyl-4'-methyl-diphenylsulfide.

Examples of the cationic photopolymerization initiator include polyarylsulfonium salts, such as triphenylsulfonium hexafluoroantimonate and triphenylsulfonium hexafluorophosphate; and polyaryliodonium salts, such as diphenyliodonium hexafluoroantimonate and P-nonylphenyliodonium hexafluoroantimonate.

The photopolymerization initiator preferably has a molecular weight of 350 or less to enhance the effect of improving external quantum efficiency and to achieve both high ejection stability and high curability. From the same perspective, the photopolymerization initiator may have a molecular weight of 330 or less. The photopolymerization initiator may have a molecular weight of 150 or more, 200 or more, 250 or more, or 300 or more to enhance the effect of improving external quantum efficiency and to achieve both high ejection stability and high curability.

The photopolymerization initiator may be commercially available. The commercial product may be "Omnirad TPO-H", "Omnirad TPO-L", "Omnirad LR8953X", "Omnirad 651", or "Omnirad 500" manufactured by IGM resin ("Omnirad" is a registered trademark), or "Lucirin TPO-G", "Irgacure 184", "Darocur 1173", or "Darocur 4625" manufactured by BASF ("Lucirin", "Irgacure", and "Darocur" are registered trademarks).

In terms of the curability of the ink composition, the photopolymerization initiator content may be 0.1 parts or more by mass, 0.5 parts or more by mass, or 1 part or more by mass per 100 parts by mass of the ethylenically unsaturated monomer. In terms of the temporal stability of a pixel unit (a cured product of the ink composition), the photopolymerization initiator content may be 40 parts or less by mass, 30 parts or less by mass, or 20 parts or less by mass per 100 parts by mass of the ethylenically unsaturated monomer.

Although each component of the ink composition is described above, the ink composition may further contain a component other than the light-emitting nanocrystal particles, light-diffusing particles, ethylenically unsaturated monomer, photopolymerization initiator, and organic ligand. The other component may be a photopolymerizable compound other than the ethylenically unsaturated monomer (for example, a monomer with an isocyanate group), a polymer dispersant, a sensitizer, or a solvent.

[Polymer Dispersant]

In the present invention, the polymer dispersant is a polymer that has a weight-average molecular weight of 750 or more and that has a functional group with an affinity for light-diffusing particles, and has a function of dispersing light-diffusing particles. The polymer dispersant adsorbs to light-diffusing particles via a functional group with an affinity for the light-diffusing particles and disperses the light-diffusing particles in the ink composition by electrostatic repulsion and/or steric repulsion between polymer dispersant molecules. The polymer dispersant is preferably bonded to and adsorbs to the surfaces of light-diffusing particles, and may be bonded to and adsorb to the surfaces of light-emitting nanocrystal particles, or may be free in the ink composition.

One possible reason for low ejection stability of a known ink composition used to form a color filter pixel unit by an ink jet method is the agglomeration of light-emitting nanocrystal particles and light-diffusing particles. Thus, the sizes or numbers of light-emitting nanocrystal particles and light-diffusing particles may be decreased to improve the ejection stability. However, this tends to decrease the effect of improving external quantum efficiency and rarely improves both the ejection stability and external quantum efficiency. In contrast, an ink composition further containing a polymer dispersant can achieve both high ejection stability and high external quantum efficiency. Although the reason for such an effect is not clear, it is surmised that the polymer dispersant can significantly reduce the agglomeration of light-emitting nanocrystal particles and light-diffusing particles (in particular, light-diffusing particles).

The functional group with an affinity for light-diffusing particles may be an acidic functional group, a basic functional group, or a nonionic functional group. The acidic functional group has a dissociative proton and may be neutralized with a base, such as an amine or a hydroxide ion. The basic functional group may be neutralized with an acid, such as an organic acid or an inorganic acid.

Examples of the acidic functional group include a carboxy group (—COOH), a sulfo group (—SO$_3$H), a sulfate group (—OSO$_3$H), a phosphonate group (—PO(OH)$_3$), a phosphate group (—OPO(OH)$_3$), a phosphinate group (—PO(OH)—), and a mercapto group (—SH).

Examples of the basic functional group include primary, secondary, and tertiary amino groups, an ammonium group, an imino group, and nitrogen-containing heterocyclic groups, such as pyridine, pyrimidine, pyrazine, imidazole, and triazole.

Examples of the nonionic functional group include a hydroxy group, an ether group, a thioether group, a sulfinyl group (—SO—), a sulfonyl group (—SO$_2$—), a carbonyl group, a formyl group, an ester group, a carbonate group, an amide group, a carbamoyl group, a ureido group, a thioamide group, a thioureido group, a sulfamoyl group, a cyano group, an alkenyl group, an alkynyl group, a phosphine oxide group, and a phosphine sulfide group.

In terms of the dispersion stability of light-diffusing particles, reduction in side effects of sedimentation of light-emitting nanocrystal particles, the ease of synthesis of a polymer dispersant, and the stability of a functional group, the acidic functional group is preferably a carboxy group, a sulfo group, a phosphonate group, or a phosphate group, and the basic functional group is preferably an amino group. Among these, a carboxy group, a phosphonate group, and an amino group are more preferred, and an amino group is most preferred.

A polymer dispersant with an acidic functional group has an acid value. A polymer dispersant with an acidic functional group preferably has an acid value in the range of 1 to 150 mgKOH/g. An acid value of 1 mgKOH/g or more tends to result in sufficient dispersibility of light-diffusing particles. An acid value of 150 mgKOH/g or less results in a smaller decrease in the storage stability of a pixel unit (a cured product of the ink composition).

With respect to the acid value of a polymer dispersant, a polymer dispersant p g is dissolved in 50 mL of a mixed solution of toluene and ethanol mixed at a volume ratio of 1:1 and 1 mL of a phenolphthalein reagent to prepare a sample liquid. The sample liquid is titrated with a 0.1 mol/L ethanolic potassium hydroxide solution (1000 mL, prepared by dissolving 7.0 g of potassium hydroxide in 5.0 mL of distilled water and adding 95% by volume ethanol) until the sample liquid turns to pink. The acid value can be calculated using the following equation:

Acid value=$q \times r \times 5.611/p$ wherein q denotes the amount (mL) of the 0.1 mol/L ethanolic potassium hydroxide solution required for the titration, r denotes the titer of the 0.1 mol/L ethanolic potassium hydroxide solution for the titration, and p denotes the mass (g) of the polymer dispersant.

A polymer dispersant with a basic functional group has an amine value. A polymer dispersant with a basic functional group preferably has an amine value in the range of 1 to 200 mgKOH/g. An amine value of 1 mgKOH/g or more tends to result in sufficient dispersibility of light-diffusing particles. An amine value of 200 mgKOH/g or less results in a smaller decrease in the storage stability of a pixel unit (a cured product of the ink composition).

With respect to the amine value of a polymer dispersant, a polymer dispersant x g is dissolved in 50 mL of a mixed solution of toluene and ethanol mixed at a volume ratio of 1:1 and 1 mL of a bromophenol blue reagent to prepare a sample liquid. The sample liquid is titrated with 0.5 mol/L hydrochloric acid until the sample liquid turns to green. The amine value can be calculated using the following equation:

Amine value=$y/x \times 28.05$ wherein y denotes the amount (ml) of 0.5 mol/L hydrochloric acid required for the titration, and x denotes the mass (g) of the polymer dispersant.

The polymer dispersant may be a polymer of a single monomer (homopolymer) or a copolymer of multiple types of monomers (copolymer). The polymer dispersant may be a random copolymer, a block copolymer, or a graft copolymer. When the polymer dispersant is a graft copolymer, the polymer dispersant may be a comb-shaped graft copolymer or a star graft copolymer. Examples of the polymer dispersant include acrylic resins, polyester resins, polyurethane resins, polyamide resins, polyethers, phenolic resins, silicone resins, polyurea resins, amino resins, polyethyleneimines, polyamines, such as polyallylamine, epoxy resins, and polyimides.

The polymer dispersant may be commercial products, which include Ajisper PB series manufactured by Ajinomoto Fine-Techno Co., Inc., DISPERBYK series and BYK series manufactured by BYK, and Efka series manufactured by BASF.

Examples of the commercial products include "DISPERBYK-130", "DISPERBYK-161", "DISPERBYK-162", "DISPERBYK-163", "DISPERBYK-164", "DISPERBYK-166", "DISPERBYK-167", "DISPERBYK-168", "DISPERBYK-170", "DISPERBYK-171", "DISPERBYK-174", "DISPERBYK-180", "DISPERBYK-182", "DISPERBYK-183", "DISPERBYK-184", "DISPERBYK-185", "DISPERBYK-2000", "DISPERBYK-2001", "DISPERBYK-2008", "DISPERBYK-2009", "DISPERBYK-2020", "DISPERBYK-2022", "DISPERBYK-2025", "DISPERBYK-2050", "DISPERBYK-2070", "DISPERBYK-2096", "DISPERBYK-2150", "DISPERBYK-2155", "DISPERBYK-2163", "DISPERBYK-2164", "BYK-LPN21116", and "BYK-LPN6919" manufactured by BYK-Chemie; "EFKA4010", "EFKA4015", "EFKA4046", "EFKA4047", "EFKA4061", "EFKA4080", "EFKA4300", "EFKA4310", "EFKA4320", "EFKA4330", "EFKA4340", "EFKA4560", "EFKA4585", "EFKA5207", "EFKA1501", "EFKA1502", "EFKA1503", and "EFKA PX-4701" manufactured by BASF; "Solsperse 3000", "Solsperse 9000", "Solsperse 13240", "Solsperse 13650", "Solsperse 13940", "Solsperse 11200", "Solsperse 13940", "Solsperse 16000", "Solsperse 17000", "Solsperse 18000", "Solsperse 20000", "Solsperse 21000", "Solsperse 24000", "Solsperse 26000", "Solsperse 27000", "Solsperse 28000", "Solsperse 32000", "Solsperse 32500", "Solsperse 32550", "Solsperse 32600", "Solsperse 33000", "Solsperse 34750", "Solsperse 35100", "Solsperse 35200", "Solsperse 36000", "Solsperse 37500", "Solsperse 38500", "Solsperse 39000", "Solsperse 41000", "Solsperse 54000", "Solsperse 71000", and "Solsperse 76500" manufactured by Lubrizol Corporation; "Ajisper PB821", "Ajisper PB822", "Ajisper PB881", "PN411", and "PA111" manufactured by Ajinomoto Fine-Techno Co., Inc.; "TEGO Dispers 650", "TEGO Dispers 660C", "TEGO Dispers 662C", "TEGO Dispers 670", "TEGO Dispers 685", "TEGO Dispers 700", "TEGO Dispers 710", and "TEGO Dispers 760W" manufactured by Evonik Industries AG.; and "Disparlon DA-703-50", "DA-705", and "DA-725" manufactured by Kusumoto Chemicals, Ltd.

Apart from these commercial products, the polymer dispersant may be synthesized by copolymerization of a cationic monomer with a basic group and/or an anionic monomer with an acidic group, a monomer with a hydrophobic group, and another optional monomer (a nonionic monomer, a monomer with a hydrophilic group, etc.). More specifically, the cationic monomer, anionic monomer, monomer with a hydrophobic group, and other monomers may be monomers described in paragraphs 0034 to 0036 of Japanese Unexamined Patent Application Publication No. 2004-250502.

The polymer dispersant may preferably be a compound produced by a reaction between a polyalkyleneamine and a polyester compound described in Japanese Unexamined Patent Application Publication No. 54-37082 and Japanese Unexamined Patent Application Publication No. 61-174939, a compound produced by modifying an amino group on a side chain of a polyallylamine with a polyester described in Japanese Unexamined Patent Application Publication No. 9-169821, a graft polymer containing a polyester macromonomer as a copolymerization component described in Japanese Unexamined Patent Application Publication No. 9-171253, and a polyester polyol adduct of a polyurethane described in Japanese Unexamined Patent Application Publication No. 60-166318, for example.

To uniformly disperse light-diffusing particles and enhance the effect of improving external quantum efficiency, the polymer dispersant may have a weight-average molecular weight of 750 or more, 1000 or more, 2000 or more, or 3000 or more. To uniformly disperse light-diffusing particles, enhance the effect of improving external quantum efficiency, make the ejection of the ink jet ink possible, and make the viscosity of the ink jet ink suitable for stable ejection, the polymer dispersant may have a weight-average molecular weight of 100000 or less, 50000 or less, or 30000 or less.

In terms of the dispersibility of light-diffusing particles, the polymer dispersant content may be 0.5 parts or more by mass, 2 parts or more by mass, or 5 parts or more by mass per 100 parts by mass of light-diffusing particles. In terms of the hydrothermal stability of a pixel unit (a cured product of the ink composition), the polymer dispersion content may be 50 parts or less by mass, 30 parts or less by mass, or 10 parts or less by mass per 100 parts by mass of light-diffusing particles.

[Sensitizer]

The sensitizer may be an amine that does not undergo an addition reaction with an ethylenically unsaturated monomer. Examples of the sensitizer include trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone.

[Solvent]

Examples of the solvent include ethylene glycol monobutyl ether acetate, diethylene glycol monobutyl ether acetate, diethylene glycol monoethyl ether acetate, diethylene glycol dibutyl ether, diethyl adipate, dibutyl oxalate, dimethyl malonate, diethyl malonate, dimethyl succinate, diethyl succinate, 1,4-butanediol diacetate, and glyceryl triacetate.

In terms of the continuous ejection stability of an ink jet ink, the solvent preferably has a boiling point of 180° C. or more. In the formation of a pixel unit, the solvent must be removed from the ink composition before the ink composition is cured. To easily remove the solvent, the solvent preferably has a boiling point of 300° C. or less.

The ethylenically unsaturated monomer in the ink composition also functions as a dispersion medium and can disperse light-diffusing particles and light-emitting nanocrystal particles without the solvent. This can advantageously obviate the need for the process of removing the solvent by drying in the formation of pixel units.

In terms of ejection stability in ink jet printing, for example, the ink composition may have a viscosity of 2 mPa·s or more, 5 mPa·s or more, or 7 mPa·s or more at 40° C. The ink composition may have a viscosity of 20 mPa·s or less, 15 mPa·s or less, or 12 mPa·s or less at 40° C. The ink composition may have a viscosity in the range of 2 to 20 mPa·s, 2 to 15 mPa·s, 2 to 12 mPa·s, 5 to 20 mPa·s, 5 to 15 mPa·s, 5 to 12 mPa·s, 7 to 20 mPa·s, 7 to 15 mPa·s, or 7 to 12 mPa·s at 40° C. In the present specification, the viscosity of an ink composition is measured with an E-type viscometer, for example.

In terms of ejection stability in ink jet printing, for example, the ink composition may have a viscosity of 5 mPa·s or more, 10 mPa·s or more, or 15 mPa·s or more at 23° C. The ink composition may have a viscosity of 40 mPa·s or less, 35 mPa·s or less, 30 mPa·s or less, or 25 mPa·s or less at 23° C. The ink composition may have a viscosity in the range of 5 to 40 mPa·s, 10 to 35 mPa·s, 10 to 30 mPa·s, 15 to 30 mPa·s, or 15 to 25 mPa·s at 23° C.

When the ink composition has a viscosity of 2 mPa·s or more at 40° C. or 5 mPa·s or more at 23° C., the meniscus shape of an ink jet ink at the tip of an ink ejection hole of an ejection head is stabilized, and the ejection (for example, the ejection rate and ejection timing) of the ink jet ink is easy to control. When the ink composition has a viscosity of 20 mPa·s or less at 40° C. or 40 mPa·s or less at 23° C., the ink jet ink can be smoothly ejected from an ink ejection hole.

The surface tension of the ink composition is preferably suitable for an ink jet method and more specifically preferably ranges from 20 to 40 mN/m, more preferably 25 to 35 mN/m. A surface tension in these ranges can result in a lower occurrence of flight deviation. The term "flight deviation", as used herein, means that the landing position of an ink composition ejected from an ink ejection hole deviates by 30 μm or more from the target position. The ink composition with a surface tension of 40 mN/m or less has a stable meniscus shape at the tip of an ink ejection hole, which makes it easy to control the ejection (for example, ejection rate and ejection timing) of the ink composition. A surface tension of 20 mN/m or more can result in a lower occurrence of flight deviation. More specifically, there is no pixel unit insufficiently filled with an ink composition due to landing outside a pixel-unit-forming region into which the ink composition is to be landed, or there is no reduction in color reproducibility due to landing of the ink composition into a pixel-unit-forming region (or pixel unit) adjacent to a pixel-unit-forming region into which the ink composition is to be landed.

When an ink composition is used as an ink composition for use in an ink jet method, the ink composition is preferably used in a piezoelectric ink jet recording apparatus with a mechanical ejection mechanism including a piezoelectric device. In the piezoelectric ink jet method, the ink composition is not instantaneously exposed to high temperature during ejection, the light-emitting nanocrystal particles are less likely to be deteriorated, and a color filter pixel unit (a light conversion layer) can more easily have expected light-emitting properties.

An embodiment of an ink composition for a color filter is described above. The ink composition according to the embodiment can be used, for example, in photolithography as well as in the ink jet method.

When an ink composition is used in photography, the ink composition is first applied to a substrate. When the ink composition contains a solvent, the ink composition is dried to form a coating film. The coating film thus formed is soluble in an alkaline developer and is patterned with the alkaline developer. To facilitate the disposal of waste developers, alkaline developers are mostly aqueous solutions. Thus, the coating film of the ink composition is treated with an aqueous solution. For an ink composition containing light-emitting nanocrystal particles (quantum dots, etc.), the light-emitting nanocrystal particles are unstable in water, and light-emitting properties (for example, fluorescence) are impaired by water. Thus, an ink jet method, which does not require treatment with an alkaline developer (aqueous solution), is preferred.

Even if a coating film of an ink composition is not treated with an alkaline developer, when the ink composition is alkali-soluble, the coating film of the ink composition easily absorbs atmospheric water, and the light-emitting properties (for example, fluorescence) of light-emitting nanocrystal particles (quantum dots, etc.) are impaired over time. From this perspective, the coating film of the ink composition is preferably alkali-insoluble. Thus, an ink composition can preferably form an alkali-insoluble coating film. Such an ink composition can be produced by using an alkali-insoluble monomer as an ethylenically unsaturated monomer. The phrase "the coating film of the ink composition is alkali-insoluble", as used herein, means that the amount of the coating film of the ink composition dissolved in 1% by mass aqueous potassium hydroxide at 25° C. is 30% or less by mass of the total mass of the coating film of the ink composition. The amount of the coating film of the ink composition dissolved is preferably 10% or less by mass, more preferably 3% or less by mass. The fact that an ink composition can form an alkali-insoluble coating film can be confirmed by applying the ink composition to a substrate, drying the ink composition at 80° C. for 3 minutes when the ink composition contains a solvent, and measuring the amount of the resulting coating film 1 μm in thickness dissolved as described above.

<Method for Producing Ink Composition>

A method for producing an ink composition according to the above embodiment is described below. The method for producing an ink composition includes at least the step of mixing light-emitting nanocrystal particles, light-diffusing particles, and at least two ethylenically unsaturated monomers. For example, the components of the ink composition are mixed and dispersed to produce the ink composition.

For example, the method for producing an ink composition includes the step of mixing light-emitting nanocrystal particles, light-diffusing particles, and ethylenically unsaturated monomers including two monomers with Hansen solubility parameters δd, δp, and δh that satisfy the following conditions.

$$16.0 \text{ MPa}^{0.5} \leq \delta d < 18.0 \text{ MPa}^{0.5}$$

$$2.5 \text{ MPa}^{0.5} \leq \delta p < 5.5 \text{ MPa}^{0.5}$$

$$2.5 \text{ MPa}^{0.5} \leq \delta h < 8.0 \text{ MPa}^{0.5}$$

For example, the method for producing an ink composition includes the step of mixing light-emitting nanocrystal particles, light-diffusing particles, and ethylenically unsaturated monomers including two monomers constituting a combination selected from the group consisting of a monofunctional monomer and a bifunctional monomer, a monofunctional monomer and a trifunctional monomer, a bifunctional monomer and a bifunctional monomer, and a bifunctional monomer and a trifunctional monomer.

For example, the method for producing an ink composition includes the steps of preparing a light-emitting nanocrystal particle dispersion containing light-emitting nanocrystal particles and a first monomer with an ethylenically unsaturated group, preparing a light-diffusing particle dispersion containing light-diffusing particles and a second monomer with an ethylenically unsaturated group, and mixing the light-emitting nanocrystal particle dispersion and the light-diffusing particle dispersion. In this production method, for example, the first monomer contains one of the two monomers that satisfy the conditions, and the second monomer contains the other of the two monomers that satisfy the conditions. For example, the first monomer contains one of the two monomers constituting the combination, and the second monomer contains the other of the two monomers constituting the combination.

In this production method, the light-emitting nanocrystal particles and light-diffusing particles are dispersed in their respective ethylenically unsaturated monomers before mixing, and the ethylenically unsaturated monomers for dispersing the light-emitting nanocrystal particles and light-diffusing particles contain different monomers. Thus, the light-emitting nanocrystal particles and light-diffusing particles can be sufficiently dispersed in the ink composition, and it is easy to achieve high ejection stability and external quantum efficiency. When the first monomer contains one of the monomer A and monomer B, and the second monomer contains the other of the monomer A and monomer B, the monomer A with the Hansen solubility parameters (HSP) δd (dispersion term), δp (polarity term), and δh (hydrogen bonding term) that satisfy the following conditions and the monomer B with the Hansen solubility parameters (HSP) δd (dispersion term), δp (polarity term), and δh (hydrogen bonding term) that satisfy the following conditions have good miscibility with each other, and the advantages of the present invention can be more easily provided.

$$16.0 \text{ MPa}^{0.5} \leq \delta d < 18.0 \text{ MPa}^{0.5}$$

$$2.5 \text{ MPa}^{0.5} \leq \delta p < 5.5 \text{ MPa}^{0.5}$$

$$2.5 \text{ MPa}^{0.5} \leq \delta h < 8.0 \text{ MPa}^{0.5}$$

To more easily achieve high ejection stability and external quantum efficiency, the HSP distance Ra (unit: MPa$^{0.5}$) between the first monomer and the second monomer is preferably 10.0 MPa$^{0.5}$ or less, more preferably 5.0 MPa$^{0.5}$ or less, still more preferably 4.5 MPa$^{0.5}$ or less. The HSP distance Ra is the distance between the coordinates ($\delta_{d1}$, $\delta_{p1}$, $\delta_{h1}$) of the first monomer and the coordinates ($\delta_{d2}$, $\delta_{p2}$, $\delta_{h2}$) of the second monomer and is defined by the following formula (a).

$$Ra=[4(\delta_{d1}-\delta_{d2})^2+(\delta_{p1}-\delta_{p2})^2+(\delta_{h1}-\delta_{h2})^2]^{1/2} \quad (a)$$

A smaller Ra is indicative of better miscibility between the first monomer and the second monomer. When the light-emitting nanocrystal particle dispersion contains multiple (for example, two) types of ethylenically unsaturated monomers as first monomers, the Hansen solubility parameters δmix of the first monomers can be determined from the Hansen solubility parameters and volume fraction of each ethylenically unsaturated monomer. For example, when the first monomer contains the monomer A and monomer B at a volume ratio of a:b, the Hansen solubility parameters $\delta_{mix}$ ($\delta d_{mix}$, $\delta p_{mix}$, $\delta h_{mix}$) of the mixture of the monomer A and monomer B can be represented by the following formula (b).

$$\delta_{mix}(\delta d_{mix},\delta p_{mix},\delta h_{mix})=[(a\times\delta d_A+b\times\delta d_B),(a\times\delta dp_A+b\times\delta dp_B),(a\times\delta h_A+b\times\delta h_B)]/(a+b) \quad (b)$$

The same applies when the light-diffusing particle dispersion contains multiple types of ethylenically unsaturated monomers as second monomers.

In the step of preparing a light-emitting nanocrystal particle dispersion, the light-emitting nanocrystal particles and the first monomer may be mixed together and dispersed to prepare the light-emitting nanocrystal particle dispersion. The light-emitting nanocrystal particles may have an organic ligand on their surfaces. Thus, the light-emitting nanocrystal particle dispersion may further contain the organic ligand. The first monomer preferably includes the monomer A. Thus, the first monomer preferably contains at least one monomer selected from the group consisting of monofunctional monomers and bifunctional monomers. The mixing and dispersion may be performed with a dispersing apparatus, such as a bead mill, a paint conditioner, a planetary mixer, or a jet mill. To improve the dispersibility of light-emitting nanocrystal particles and to easily adjust the average particle size of light-emitting nanocrystal particles in a desired range, a bead mill, a paint conditioner, or a jet mill is preferably used.

In the step of preparing light-diffusing particle dispersion, the light-diffusing particles and the second monomer may be mixed together and dispersed to prepare the light-diffusing particle dispersion. The second monomer preferably includes the monomer B. Thus, the second monomer preferably contains at least one monomer selected from the group consisting of bifunctional monomers and trifunctional monomers. The mixing and dispersion may be performed with the apparatus used in the step of preparing light-emitting nanocrystal particles. To improve the dispersibility of light-diffusing particles and to easily adjust the average particle size of light-diffusing particles in a desired range, a bead mill or a paint conditioner is preferably used.

In the step of preparing a light-diffusing particle dispersion, a polymer dispersant may be further mixed. Thus, the light-diffusing particle dispersion may further contain the polymer dispersant. Mixing the light-diffusing particles with the polymer dispersant before mixing the light-emitting nanocrystal particles with the light-diffusing particles can more sufficiently disperse the light-diffusing particles. This can more easily achieve high ejection stability and external quantum efficiency.

This production method may further use a component (for example, a photopolymerization initiator, a sensitizer, a solvent, etc.) other than the light-emitting nanocrystal particles, the light-diffusing particles, the ethylenically unsaturated monomers, the organic ligand, and the polymer dispersant. In this case, the other component may be contained in the light-emitting nanocrystal particle dispersion or the light-diffusing particle dispersion. Alternatively, the other component may be contained in a composition produced by mixing the light-emitting nanocrystal particle dispersion with the light-diffusing particle dispersion.

<Light Conversion Layer and Color Filter>

A light conversion layer and a color filter produced by using the ink composition according to the above embodiment are described in detail below with reference to the accompanying drawing. In the following description, the same or corresponding elements are denoted by the same reference numerals and letters and are not repeatedly described.

FIG. 1 is a schematic cross-sectional view of a color filter according to an embodiment. As illustrated in FIG. 1, a color filter 100 includes a substrate 40 and a light conversion layer 30 located on the substrate 40. The light conversion layer 30 includes a plurality of pixel units 10 and a light-shielding portion 20.

The light conversion layer 30 includes, as the pixel units 10, a first pixel unit 10a, a second pixel unit 10b, and a third pixel unit 10c. The first pixel unit 10a, the second pixel unit 10b, and the third pixel unit 10c are repetitively arranged in a grid-like pattern in this order. The light-shielding portion 20 is located between adjacent pixel units, that is, between the first pixel unit 10a and the second pixel unit 10b, between the second pixel unit 10b and the third pixel unit 10c, and between the third pixel unit 10c and the first pixel unit 10a. In other words, these adjacent pixel units are separated by the light-shielding portion 20.

Each of the first pixel unit 10a and the second pixel unit 10b contains the cured product of the ink composition according to the above embodiment. The cured product contains the light-emitting nanocrystal particles, the light-diffusing particles, and a cured component. The cured component is a cured product of the ethylenically unsaturated monomer and is more specifically a cured product produced by polymerization of the ethylenically unsaturated monomer. Thus, the first pixel unit 10a includes a first cured component 13a as well as first light-emitting nanocrystal particles 11a and first light-diffusing particles 12a each dispersed in the first cured component 13a. Likewise, the second pixel unit 10b includes a second cured component 13b as well as second light-emitting nanocrystal particles 11b and second light-diffusing particles 12b each dispersed in the second cured component 13b. In the first pixel unit 10a and the second pixel unit 10b, the first cured component 13a may be the same as or different from the second cured component 13b, and the first light-diffusing particles 12a may be the same as or different from the second light-diffusing particles 12b.

The first light-emitting nanocrystal particles 11a are red-light-emitting nanocrystal particles that absorb light with a wavelength in the range of 420 to 480 nm and emit light with an emission peak wavelength in the range of 605 to 665 nm. Thus, the first pixel unit 10a may also be referred to as a red pixel unit that converts blue light to red light. The second light-emitting nanocrystal particles 11b are green-light-emitting nanocrystal particles that absorb light with a wavelength in the range of 420 to 480 nm and emit light with an emission peak wavelength in the range of 500 to 560 nm. Thus, the second pixel unit 10b may also be referred to as a green pixel unit that converts blue light to green light.

The light-emitting nanocrystal particle content of the pixel unit containing the cured product of the ink composition is preferably 5% or more by mass of the total mass of the cured product of the ink composition in terms of the enhanced effect of improving external quantum efficiency and high emission intensity. From the same perspective, the light-emitting nanocrystal particle content may be 10% or more by mass, 15% or more by mass, or 20% or more by mass of the total mass of the cured product of the ink composition. The light-emitting nanocrystal particle content is preferably 50% or less by mass of the total mass of the cured product of the ink composition in terms of high reliability of a pixel unit and high emission intensity. From the same perspective, the light-emitting nanocrystal particle content may be 40% or less by mass, 35% or less by mass, or 30% or less by mass of the total mass of the cured product of the ink composition.

The light-diffusing particle content of the pixel unit containing the cured product of the ink composition may be 0.1% or more by mass, 1% or more by mass, 5% or more by mass, 7% or more by mass, 10% or more by mass, or 12% or more by mass of the total mass of the cured product of the ink composition in terms of the enhanced effect of improving external quantum efficiency. The light-diffusing particle content may be 60% or less by mass, 50% or less by mass, 40% or less by mass, 30% or less by mass, 25% or less by mass, 20% or less by mass, or 15% or less by mass of the total mass of the cured product of the ink composition in terms of the enhanced effect of improving external quantum efficiency and in terms of high reliability of the pixel unit.

The third pixel unit 10c has a light transmittance of 30% or more at a wavelength in the range of 420 to 480 nm. Thus, the third pixel unit 10c functions as a blue pixel unit when a light source is used to emit light with a wavelength in the range of 420 to 480 nm. For example, the third pixel unit 10c contains the cured product of the composition containing the ethylenically unsaturated monomer. The cured product contains a third cured component 13c. The third cured component 13c is a cured product of the ethylenically unsaturated monomer and is more specifically a cured product produced by polymerization of the ethylenically unsaturated monomer. Thus, the third pixel unit 10c contains the third cured component 13c. When the third pixel unit 10c contains the cured product, the composition containing the ethylenically unsaturated monomer may further contain a component contained in the ink composition other than the ethylenically unsaturated monomer, provided that the third pixel unit 10c has a light transmittance of 30% or more at a wavelength in the range of 420 to 480 nm. The transmittance in the third pixel unit 10c can be measured with a microspectrometer.

The pixel units (the first pixel unit 10a, the second pixel unit 10b, and the third pixel unit 10c) may have a thickness of 1 μm or more, 2 μm or more, or 3 μm or more, for example. The pixel units (the first pixel unit 10a, the second pixel unit 10b, and the third pixel unit 10c) may have a thickness of 30 μm or less, 20 μm or less, or 15 μm or less, for example.

The light-shielding portion 20 is a black matrix that is formed to separate adjacent pixel units and prevent color mixing and to prevent light leakage from a light source. The material of the light-shielding portion 20 may be, but is not limited to, a metal, such as chromium, or a cured product of a resin composition containing light-shielding particles, such as carbon fine particles, metal oxide, an inorganic pigment, or an organic pigment, in a binder polymer. The binder polymer may be a mixture of one or two or more resins, such as polyimide resins, acrylic resins, epoxy resins, polyacrylamides, poly(vinyl alcohol), gelatin, casein, and cellulose, may be a photosensitive resin, or may be an O/W emulsion-type resin composition (for example, emulsified reactive silicone). For example, the light-shielding portion 20 may have a thickness of 0.5 μm or more and may have a thickness of 10 μm or less.

The substrate 40 is a light-transmitting transparent substrate, for example, a transparent glass substrate, such as a quartz glass sheet, a Pyrex (registered trademark) glass sheet, or a synthetic quartz sheet, or a transparent flexible substrate, such as a transparent resin film or an optical resin film. Among these, preferred is a glass substrate formed of non-alkali glass containing no alkaline component in glass. More specifically, preferred are "7059 glass", "1737 glass", "Eagle 200", and "Eagle XG" manufactured by Corning Inc., "AN100" manufactured by Asahi Glass Co., Ltd., and "OA-10G" and "OA-11" manufactured by Nippon Electric Glass Co., Ltd. These are materials with a low thermal expansion coefficient and have high dimensional stability and high workability in high-temperature heat treatment.

The color filter 100 including the light conversion layer 30 is suitably used when a light source is used to emit light with a wavelength in the range of 420 to 480 nm.

For example, the color filter 100 can be produced by forming a pattern of the light-shielding portion 20 on the substrate 40, selectively applying the ink composition (ink jet ink) according to the embodiment by an ink jet method to a pixel-unit-forming region divided by the light-shielding portion 20 on the substrate 40, and curing the ink composition by active energy beam irradiation.

A method for forming the light-shielding portion 20 may be a method for forming a thin metal film, such as chromium, or a thin film of a resin composition containing light-shielding particles in a boundary region between a plurality of pixel units on a surface of the substrate 40, and patterning the thin film. For example, the thin metal film can be formed by sputtering or vacuum evaporation, and the thin film of a resin composition containing light-shielding particles can be formed by coating or printing. The patterning may be performed by photolithography.

The ink jet method may be a Bubble Jet (registered trademark) method using an electrothermal transducer as an energy-generating device or a piezoelectric ink jet method using a piezoelectric device.

When the ink composition is cured by active energy beam (for example, ultraviolet light) irradiation, for example, a mercury lamp, a metal halide lamp, a xenon lamp, or LED may be used. For example, the irradiation light may have a wavelength of 200 nm or more and may have a wavelength of 440 nm or less. For example, the light exposure may be 10 mJ/cm$^2$ or more and may be 4000 mJ/cm$^2$ or less.

The drying temperature at which the solvent is volatilized may be 50° C. or more and may be 150° C. or less. The drying time may be 3 minutes or more and may be 30 minutes or less.

Although the embodiments of color filters and light conversion layers and methods for producing these are described above, the present invention are not limited to these embodiments.

For example, the light conversion layer may include a pixel unit (a blue pixel unit) containing a cured product of an ink composition containing blue-light-emitting nanocrystal particles instead of the third pixel unit 10c or in addition to the third pixel unit 10c. The light conversion layer may include a pixel unit (for example, a yellow pixel unit) containing a cured product of an ink composition containing nanocrystal particles that emit color light other than red, green, or blue. In these cases, the light-emitting nanocrystal particles in each pixel unit of the light conversion layer preferably have an absorption maximum wavelength in the same wavelength region.

At least part of the pixel units in the light conversion layer may contain a cured product of a composition containing a pigment other than the light-emitting nanocrystal particles.

A color filter may include an ink-repellent layer formed of an ink-repellent material, which is narrower than the light-shielding portion, on the pattern of the light-shielding portion. Instead of the ink-repellent layer, a photocatalyst-containing layer serving as a wettability variable layer may be formed in the solid pattern to a region including the pixel-unit-forming region, and then the photocatalyst-containing layer may be irradiated with light through a photomask to selectively increase the affinity of the pixel-unit-forming region to ink. The photocatalyst may be titanium oxide or zinc oxide.

A color filter may include an ink-receiving layer containing hydroxypropylcellulose, poly(vinyl alcohol), or gelatin between a substrate and a pixel unit.

A color filter may include a protective layer on a pixel unit. The protective layer is formed to flatten the color filter and to prevent the elution of components contained in the pixel unit or the elution of components contained in the pixel unit and components contained in a photocatalyst-containing layer to a liquid crystal layer. Materials of the protective layer may be those used in protective layers for known color filters.

In the production of a color filter and a light conversion layer, a pixel unit may be formed by photolithography instead of an ink jet method. In this case, first, an ink composition is applied in a layer to a substrate to form an ink composition layer. The ink composition layer is then exposed to patterned light and is then developed with a developer. In this manner, a pixel unit formed of a cured product of the ink composition is formed. The developer is typically alkaline, and therefore an alkali-soluble material is used as a material of the ink composition. In terms of the efficiency in the use of materials, the ink jet method is superior to photolithography. This is because almost two-thirds or more of the materials are theoretically removed as wastes in photolithography. Thus, a pixel unit is preferably formed by an ink jet method using an ink jet ink.

In addition to the above light-emitting nanocrystal particles, the pixel unit in the light conversion layer may further contain a pigment of almost the same color as the emission color of the light-emitting nanocrystal particles. For example, when a pixel unit containing light-emitting nanocrystal particles that absorb blue light for light emission is used as a pixel unit of a liquid crystal display device, blue light or quasi-white light with a peak at 450 nm is used as light from a light source. When the concentration of the light-emitting nanocrystal particles in the pixel unit is insufficient, light from the light source passes through the light conversion layer while the liquid crystal display device is driven. The transmitted light (blue light, leakage light) from the light source mixes with light from the light-emitting nanocrystal particles. To prevent a reduction in color reproducibility due to such color mixing, the pixel unit in the light conversion layer may contain a pigment. To introduce a pigment into the pixel unit, the ink composition may contain the pigment.

One or two of the red pixel unit (R), the green pixel unit (G), and the blue pixel unit (B) in the light conversion layer may be used as a pixel unit or pixel units that do not contain light-emitting nanocrystal particles but contain a coloring material. The coloring material to be used may be a known coloring material. For example, a coloring material for the red pixel unit (R) is a diketopyrrolopyrrole pigment and/or an anionic red organic dye. A coloring material for the green pixel unit (G) may be at least one selected from the group consisting of halogenated copper phthalocyanine pigments, phthalocyanine green dyes, and mixtures of phthalocyanine blue dyes and azo yellow organic dyes. A coloring material for the blue pixel unit (B) may be an copper phthalocyanine pigment and/or a cationic blue organic dye. To prevent a decrease in transmittance, the amount of each coloring material to be used in a light conversion layer preferably ranges from 1% to 5% by mass of the total mass of the pixel unit (a cured product of the ink composition).

EXAMPLES

The present invention is further described in the following examples. However, the present invention is not limited to these examples. For all the materials used in the examples, argon gas was introduced to replace dissolved oxygen with argon gas. Titanium oxide before mixing was heated under a reduced pressure of 1 mmHg for 2 hours at 120° C. and was left to cool in an argon gas atmosphere. The liquid materials used in the examples before mixing were dehydrated with a molecular sieve 3A for 48 hours or more.

<Preparation of Ethylenically Unsaturated Monomer>

Monomers listed below in Table 1 were prepared as ethylenically unsaturated monomers.

TABLE 1

| Compound name | Abbreviation | Number of ethylenically unsaturated groups | Viscosity at 23° C. (mPa · s) | Hansen solubility parameters | | |
|---|---|---|---|---|---|---|
| | | | | δd | δp | δh |
| Isobornyl acrylate | IBA | 1 (monofunctional) | 8 | 16.7 | 2.6 | 2.8 |
| Ethoxyethoxyethyl acrylate | EOEOA | 1 (monofunctional) | 3 | 16.1 | 5.4 | 6.6 |
| 2-hydroxyethyl acrylate | HEA | 1 (monofunctional) | 6 | 16.0 | 13.2 | 13.4 |
| Dipropylene glycol diacrylate | DPGDA | 2 (bifunctional) | 9 | 16.4 | 4.8 | 6.4 |
| Glycerin triacrylate | GTA | 3 (trifunctional) | 30 | 16.9 | 5.2 | 7.8 |
| Trimethylolethane triacrylate | TMETA | 3 (trifunctional) | 58 | 16.8 | 4.0 | 6.6 |

TABLE 1-continued

| Compound name | Abbreviation | Number of ethylenically unsaturated groups | Viscosity at 23° C. (mPa · s) | Hansen solubility parameters | | |
|---|---|---|---|---|---|---|
| | | | | δd | δp | δh |
| 1,6-hexanediol dimethacrylate | HDDMA | 2 (bifunctional) | 6 | 16.4 | 4.6 | 6.1 |

IBA: manufactured by Miwon Specialty Chemical Co., Ltd.
EOEOA: manufactured by Miwon Specialty Chemical Co., Ltd.
HEA: manufactured by Kanto Chemical Co., Inc.
DPGDA: manufactured by Miwon Specialty Chemical Co., Ltd.
GTA: manufactured by Toagosei Co., Ltd.
TMETA: manufactured by Shin Nakamura Chemical Co., Ltd.
HDDMA: manufactured by Shin Nakamura Chemical Co., Ltd.

<Preparation of Red-Light-Emitting InP/ZnSeS/ZnS Nanocrystal Particle Dispersion>

[Preparation of Indium Laurate Solution]

10 g of 1-octadecene (ODE), 146 mg (0.5 mmol) of indium acetate, and 300 mg (1.5 mmol) of lauric acid were put into a reaction flask to prepare a mixture. The mixture was heated under vacuum at 140° C. for 2 hours to prepare a transparent solution (an indium laurate solution). The solution was stored in a glove box at room temperature until its use. Indium laurate is less soluble at room temperature and precipitates easily. Thus, when used, a required amount of the indium laurate solution was weighed to prepare a transparent solution after the indium laurate precipitate in the solution (the ODE mixture) was heated to approximately 90° C.

[Preparation of Core (InP Core) of Red-Light-Emitting Nanocrystal Particles]

5 g of trioctylphosphine oxide (TOPO), 1.46 g (5 mmol) of indium acetate, and 3.16 g (15.8 mmol) of lauric acid were put into a reaction flask to prepare a mixture. The mixture was heated in a nitrogen ($N_2$) environment at 160° C. for 40 minutes and was heated under vacuum at 250° C. for 20 minutes. The reaction temperature (the temperature of the mixture) was then increased to 300° C. in a nitrogen ($N_2$) environmental. At this temperature, a mixture of 3 g of 1-octadecene (ODE) and 0.25 g (1 mmol) of tris(trimethylsilyl)phosphine was rapidly put into the reaction flask, and the reaction temperature was kept at 260° C. After five minutes, the heater was removed to stop the reaction, and the reaction solution was cooled to room temperature. 8 ml of toluene and 20 ml of ethanol were then added to the reaction solution in a glove box. After InP nanocrystal particles were precipitated by centrifugation, the supernatant was decantated to collect the InP nanocrystal particles. The InP nanocrystal particles were then dispersed in hexane. Thus, a dispersion liquid (hexane dispersion liquid) containing 5% by mass InP nanocrystal particles was prepared.

The hexane dispersion liquid of the InP nanocrystal particles and the indium laurate solution were poured into a reaction flask to prepare a mixture. The amounts of the hexane dispersion liquid of the InP nanocrystal particles and the indium laurate solution were adjusted to be 0.5 g (InP nanocrystal particles: 25 mg) and 5 g (indium laurate: 178 mg), respectively. The mixture was left standing under vacuum at room temperature for 10 minutes. The flask was then filled with nitrogen gas at normal pressure. The mixture was heated to 230° C. and was held at the temperature for 2 hours to remove hexane from the flask. The internal temperature of the flask was then increased to 250° C. A mixture of 3 g of 1-octadecene (ODE) and 0.03 g (0.125 mmol) of tris(trimethylsilyl)phosphine was rapidly introduced into the reaction flask. The reaction temperature was held at 230° C. After five minutes, the heater was removed to stop the reaction, and the reaction solution was cooled to room temperature. 8 ml of toluene and 20 ml of ethanol were then added to the reaction solution in a glove box. InP nanocrystal particles (InP cores) serving as cores of red-light-emitting InP/ZnSeS/ZnS nanocrystal particles were then precipitated by centrifugation. The supernatant was decanted to collect the InP nanocrystal particles (InP cores). The InP nanocrystal particles (InP cores) were then dispersed in hexane to prepare a dispersion liquid (hexane dispersion liquid) containing 5% by mass InP nanocrystal particles (InP cores).

[Formation of Shells (ZnSeS/ZnS Shells) of Red-Light-Emitting Nanocrystal Particles]

2.5 g of the hexane dispersion liquid of the InP nanocrystal particles (InP cores) was poured into a reaction flask. 0.7 g of oleic acid was put into the reaction flask at room temperature. The temperature was increased to 80° C. and was held for 2 hours. 14 mg of diethylzinc, 8 mg of bis(trimethylsilyl)selenide, and 7 mg of hexamethyldisilathiane dissolved in 1 ml ODE (a ZnSeS precursor solution) were then added dropwise to the reaction mixture, were heated to 200° C., and were held for 10 minutes to form a ZnSeS shell with a thickness of 0.5 monolayers.

The temperature was then increased to 140° C. and was held for 30 minutes. A ZnS precursor solution of 69 mg of diethylzinc and 66 mg of hexamethyldisilathiane dissolved in 2 ml of ODE was then added dropwise to the reaction mixture. The temperature was increased to 200° C. and was held for 30 minutes to form a ZnS shell with a thickness of two monolayers. Ten minutes after the ZnS precursor solution was added dropwise, the heater was removed to stop the reaction. The reaction mixture was then cooled to room temperature. The resulting white precipitate was removed by centrifugation to obtain a transparent nanocrystal particle dispersion liquid (an ODE dispersion liquid of InP/ZnSeS/ZnS nanocrystal particles) in which red-light-emitting InP/ZnSeS/ZnS nanocrystal particles were dispersed.

[Synthesis of Organic Ligand of InP/ZnSeS/ZnS Nanocrystal Particles]

JEFF
AMINE M-1000 (manufactured by Huntsman Corporation) was put into a flask. The same number of moles of succinic anhydride (manufactured by Sigma-Aldrich Corporation) was then added to the JEFAMINE M-1000 in a nitrogen gas environment while stirring. The internal temperature of the flask was increased to 80° C. After stirring for 8 hours, a light yellow viscous oily ligand represented by the following formula (1A) was obtained.

[Chem. 5]

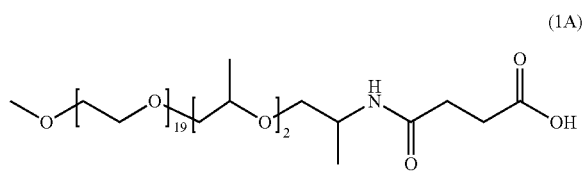

(1A)

[Preparation of Red-Light-Emitting InP/ZnSeS/ZnS Nanocrystal Particle Dispersion by Ligand Exchange]

30 mg of the organic ligand was added to 1 ml of the ODE dispersion liquid of the InP/ZnSeS/ZnS nanocrystal particles. The ODE dispersion liquid was then heated at 90° C. for 5 hours for ligand exchange. With the progress of the ligand exchange, the nanocrystal particles agglomerated. After the completion of the ligand exchange, the supernatant was decantated to collect the nanocrystal particles. 3 ml of ethanol was then added to the nanocrystal particles, and the nanocrystal particles were redispersed by ultrasonication. 10 ml of n-hexane was added to 3 mL of the ethanol dispersion liquid of nanocrystal particles. The nanocrystal particles were then precipitated by centrifugation. The nanocrystal particles (InP/ZnSeS/ZnS nanocrystal particles modified with the organic ligand) were collected by decantation of the supernatant and by drying under vacuum. The organic ligand content of the nanocrystal particles modified with the organic ligand was 30% by mass. The nanocrystal particles (InP/ZnSeS/ZnS nanocrystal particles modified with the organic ligand) were dispersed in EOEOA such that the nanocrystal particle content of the dispersion was 34.5% by mass. Thus, a red-light-emitting nanocrystal particle dispersion 1 was prepared. The EOEOA content of the dispersion was 65.5% by mass.

A red-light-emitting nanocrystal particle dispersion 2 was prepared in the same manner as described above except that EOEOA was replaced with HDDMA. A red-light-emitting nanocrystal particle dispersion 3 was prepared in the same manner as described above except that EOEOA was replaced with DPGDA.

<Preparation of Green-Light-Emitting InP/ZnSeS/ZnS Nanocrystal Particle Dispersion>
[Synthesis of Core (InP Core) of Green-Light-Emitting Nanocrystal Particles]

5 g of trioctylphosphine oxide (TOPO), 1.46 g (5 mmol) of indium acetate, and 3.16 g (15.8 mmol) of lauric acid were put into a reaction flask to prepare a mixture. The mixture was heated in a nitrogen ($N_2$) environment at 160° C. for 40 minutes and was heated under vacuum at 250° C. for 20 minutes. The reaction temperature (the temperature of the mixture) was then increased to 300° C. in a nitrogen ($N_2$) environment. At this temperature, a mixture of 3 g of 1-octadecene (ODE) and 0.25 g (1 mmol) of tris(trimethylsilyl)phosphine was rapidly put into the reaction flask, and the reaction temperature was kept at 260° C. After five minutes, the heater was removed to stop the reaction, and the reaction solution was cooled to room temperature. 8 ml of toluene and 20 ml of ethanol were then added to the reaction solution in a glove box. After InP nanocrystal particles (InP cores) were precipitated by centrifugation, the supernatant was decantated to collect the InP nanocrystal particles (InP cores). The InP nanocrystal particles (InP cores) were then dispersed in hexane to prepare a dispersion liquid (a hexane dispersion liquid) containing 5% by mass InP nanocrystal particles (InP cores).

[Synthesis of Shells (ZnSeS/ZnS Shells) of Green-Light-Emitting Nanocrystal Particles]

2.5 g of the hexane dispersion liquid of the InP nanocrystal particles (InP cores) was poured into a reaction flask. 0.7 g of oleic acid was put into the reaction flask at room temperature. The temperature was increased to 80° C. 14 mg of diethylzinc, 8 mg of bis(trimethylsilyl)selenide, and 7 mg of hexamethyldisilathiane dissolved in 1 ml ODE (a ZnSeS precursor solution) were then added dropwise to the reaction mixture to form a ZnSeS shell with a thickness of 0.5 monolayers.

After the ZnSeS precursor solution was added dropwise, the reaction temperature was held at 80° C. for 10 minutes. The temperature was then increased to 140° C. and was held for 30 minutes. A ZnS precursor solution of 69 mg of diethylzinc and 66 mg of hexamethyldisilathiane dissolved in 2 ml of ODE was added dropwise to the reaction mixture to form a ZnS shell with a thickness of two monolayers. Ten minutes after the ZnS precursor solution was added dropwise, the heater was removed to stop the reaction. The reaction mixture was then cooled to room temperature. The resulting white precipitate was removed by centrifugation to obtain a transparent nanocrystal particle dispersion liquid (ODE dispersion liquid) in which green-light-emitting InP/ZnSeS/ZnS nanocrystal particles were dispersed.

[Preparation of Green-Light-Emitting InP/ZnSeS/ZnS Nanocrystal Particle Dispersion by Ligand Exchange]

30 mg of the organic ligand was added to 1 ml of the ODE dispersion liquid of the nanocrystal particles. The ODE dispersion liquid was then heated at 90° C. for 5 hours for ligand exchange. With the progress of the ligand exchange, the nanocrystal particles agglomerated. After the completion of the ligand exchange, the supernatant was decantated, and 3 ml of ethanol was added to the nanocrystal particles. The nanocrystal particles were redispersed by ultrasonication. 10 ml of n-hexane was added to 3 mL of the ethanol dispersion liquid of nanocrystal particles. The nanocrystal particles were then precipitated by centrifugation. The nanocrystal particles (InP/ZnSeS/ZnS nanocrystal particles modified with the organic ligand) were collected by decantation of the supernatant and by drying under vacuum. The organic ligand content of the nanocrystal particles modified with the organic ligand was 35% by mass. The nanocrystal particles (InP/ZnSeS/ZnS nanocrystal particles modified with the organic ligand) were dispersed in EOEOA such that the nanocrystal particle content of the dispersion was 30.0% by mass. Thus, a green-light-emitting nanocrystal particle dispersion 1 was prepared. The EOEOA content of the dispersion was 70.0% by mass.

A green-light-emitting nanocrystal particle dispersion 2 was prepared in the same manner as described above except that EOEOA was replaced with HDDMA. A green-light-emitting nanocrystal particle dispersion 3 was prepared in the same manner as described above except that EOEOA was replaced with DPGDA.

<Preparation of Light-Diffusing Particle Dispersion>

33.0 g of titanium oxide (trade name: CR-60-2, manufactured by Ishihara Sangyo Kaisha, Ltd., average particle size (volume-average size): 210 nm), 1.00 g of a polymer dispersant (trade name: Ajisper PB-821, manufactured by Ajinomoto Fine-Techno Co., Inc.), and 26.0 g of DPGDA were mixed in a vessel filled with argon gas. Zirconia beads (diameter: 1.25 mm) were added to the mixture and were shaken in a paint conditioner for 2 hours to disperse the mixture. The zirconia beads were removed using a polyester mesh filter to prepare a light-diffusing particle dispersion 1 (titanium oxide content: 55% by mass). The DPGDA content of the dispersion was 43.3% by mass.

A light-diffusing particle dispersion 2 was prepared in the same manner as described above except that DPGDA was replaced with TMETA. A light-diffusing particle dispersion 3 was prepared in the same manner as described above except that DPGDA was replaced with GTA. A light-diffusing particle dispersion 4 was prepared in the same manner as described above except that DPGDA was replaced with HDDMA. A light-diffusing particle dispersion 5 was prepared in the same manner as described above except that DPGDA was replaced with HEA.

Example 1

[Preparation of Red Ink Composition (Ink Jet Ink)]
5.94 g of the red-light-emitting nanocrystal particle dispersion 1, 3.71 g of the light-diffusing particle dispersion 1, and 0.35 g of a photopolymerization initiator ethyl phenyl (2,4,6-trimethylbenzoyl)phosphinate (manufactured by IGM resins, trade name: Omnirad TPO-L) were homogeneously mixed in a vessel filled with argon gas. The mixture was then passed through a filter with a pore size of 5 µm in a glove box. Argon gas was introduced into a vessel containing the filtrate to saturate the vessel with argon gas. The argon gas was then removed under reduced pressure. Thus, an ink composition was produced.

Example 2

An ink composition was prepared in the same manner as in Example 1 except that the light-diffusing particle dispersion 1 was replaced with the light-diffusing particle dispersion 2.

Example 3

An ink composition was prepared in the same manner as in Example 1 except that the red-light-emitting nanocrystal particle dispersion 1 was replaced with the red-light-emitting nanocrystal particle dispersion 2.

Example 4

An ink composition was prepared in the same manner as in Example 1 except that the red-light-emitting nanocrystal particle dispersion 1 was replaced with the red-light-emitting nanocrystal particle dispersion 2 and that the light-diffusing particle dispersion 1 was replaced with the light-diffusing particle dispersion 3.

Example 5

An ink composition was prepared in the same manner as in Example 1 except that the red-light-emitting nanocrystal particle dispersion 1 was replaced with the red-light-emitting nanocrystal particle dispersion 3 and that the light-diffusing particle dispersion 1 was replaced with the light-diffusing particle dispersion 4.

Comparative Example 1

An ink composition was prepared in the same manner as in Example 1 except that the light-diffusing particle dispersion 1 was replaced with the light-diffusing particle dispersion 5.

Example 6

[Preparation of Green Ink Composition (Ink Jet Ink)]
6.83 g of the green-light-emitting nanocrystal particle dispersion 1, 2.82 g of the light-diffusing particle dispersion 1, and 0.35 g of a photopolymerization initiator ethyl phenyl(2,4,6-trimethylbenzoyl)phosphinate (manufactured by IGM resins, trade name: Omnirad TPO-L) were homogeneously mixed in a vessel filled with argon gas. The mixture was then passed through a filter with a pore size of 5 µm in a glove box. Argon gas was introduced into a vessel containing the filtrate to saturate the vessel with argon gas. The argon gas was then removed under reduced pressure. Thus, an ink composition was produced.

Example 7

An ink composition was prepared in the same manner as in Example 6 except that the light-diffusing particle dispersion 1 was replaced with the light-diffusing particle dispersion 2.

Example 8

An ink composition was prepared in the same manner as in Example 6 except that the green-light-emitting nanocrystal particle dispersion 1 was replaced with the green-light-emitting nanocrystal particle dispersion 2.

Example 9

An ink composition was prepared in the same manner as in Example 6 except that the green-light-emitting nanocrystal particle dispersion 1 was replaced with the green-light-emitting nanocrystal particle dispersion 2 and that the light-diffusing particle dispersion 1 was replaced with the light-diffusing particle dispersion 3.

Example 10

An ink composition was prepared in the same manner as in Example 6 except that the green-light-emitting nanocrystal particle dispersion 1 was replaced with the green-light-emitting nanocrystal particle dispersion 3 and that the light-diffusing particle dispersion 1 was replaced with the light-diffusing particle dispersion 4.

<Evaluation>
[Evaluation of Ejection Stability]
An ink composition prepared was stored at 23° C. and at 50% RH for 1 week. The stored ink composition was subjected to an ejection test with an ink jet printer (manufactured by FUJIFILM Dimatix, trade name "DMP-2831"). In the ejection test, the ink jet head temperature was increased to 40° C., and the ink composition was continuously ejected for 10 minutes. An ink ejection head of the ink jet printer had 16 nozzles, and the amount of ink composition in each nozzle was 10 pL per ejection. The ejection stability of each of the ink compositions according to Examples 1 to 10 and Comparative Example 1 was rated according to the following criteria. Tables 2 to 4 show the results.

A: Continuous ejection was possible (continuous ejection was possible in at least 10 of the 16 nozzles).

B: Continuous ejection was impossible (continuous ejection was possible in 9 or less of the 16 nozzles).

C: Ejection was impossible.

[Evaluation of Curability]

The curability of each of the ink compositions according to Examples 1 to 10 and Comparative Example 1 was evaluated. More specifically, the ink composition was applied to a glass substrate (slide glass) with a spin coater to a film thickness of 4 µm. The resulting film was placed in a box purged with nitrogen and was irradiated with ultraviolet light at 500 m J/cm$^2$. After the ultraviolet irradiation, the surface of the film was rubbed with a cotton swab to rate the curability according to the following criteria. Tables 2 to 4 show the results. In the examples rated A, a layer of a cured product of the ink composition (a light conversion layer) was formed on the glass substrate.

A: Cured (the ink composition did not adhere to the tip of the cotton swab).

B: Uncured (the ink composition adhered to the tip of the cotton swab).

[Evaluation of External Quantum Efficiency (EQE)]

A blue LED (peak emission wavelength: 450 nm) manufactured by CCS Inc. was used as a surface-emitting light source. An array spectrometer (trade name "MCPD-9800") manufactured by Otsuka Electronics Co., Ltd. coupled to an integrating sphere was used as a measuring apparatus. The integrating sphere was installed over the blue LED. A substrate with a light conversion layer formed in the same manner as in the evaluation of curability was placed between the blue LED and the integrating sphere. After the blue LED was turned on, a spectrum and an illuminance at each wavelength were measured.

The external quantum efficiency was determined from the spectrum and illuminance measured with the measuring apparatus, as described below. This value is indicative of the fraction of light (photons) incident on the light conversion layer and radiated as fluorescence toward the observer. Thus, a larger value is indicative of better light-emitting properties of the light conversion layer, and the value is an important performance index.

Red EQE (%)=$P1$(Red)/$E$(Blue)×100

Green EQE (%)=$P2$(Green)/$E$(Blue)×100

In the formulae, $E$(Blue), $P1$(Red), and $P2$(Green) denote the following.

$E$(Blue): The total value of "illuminance×wavelength/$hc$" at a wavelength range of 380 to 490 nm.

$P1$(Red): The total value of "illuminance×wavelength/$hc$" at a wavelength range of 590 to 780 nm.

$P2$(Green): The total value of "illuminance×wavelength/$hc$" at a wavelength range of 500 to 650 nm.

Each value corresponds to the number of photons observed. Furthermore, h denotes the Planck constant, and c denotes the speed of light.

The effect of improving external quantum efficiency in the red ink compositions according to Examples 1 to 5 and Comparative Example 1 was rated according to the following criteria. Tables 2 and 3 show the results.

A: 20% or more

B: 15% or more and less than 20%

C: less than 15%

The effect of improving external quantum efficiency in the green ink compositions according to Examples 6 to 10 was rated according to the following criteria. Table 4 shows the results.

A: 15% or more

B: 10% or more and less than 15%

C: less than 10%

[Evaluation of Quantum Yield (QY) of Ink Composition]

The quantum yield (QY) of each of the ink compositions according to Examples 1 to 10 and Comparative Example 1 was measured with an absolute quantum yield spectrometer Quantaurus-QY manufactured by Hamamatsu Photonics K.K. in solution measurement mode. More specifically, first, 4000 µl of propylene glycol monomethyl ether acetate (PGMEA) was put into a special cell, and 12 µl of the ink composition according to Example 1 was added to PGMEA to prepare a sample. Samples of Examples 2 to 10 and Comparative Example 1 were prepared in the same manner except that the ink composition according to Example 1 was replaced with the ink compositions according to Examples 2 to 10 and Comparative Example 1. The samples of Examples 1 to 10 and Comparative Example 1 were then used to measure the quantum yield (QY) of each of the ink compositions according to Examples 1 to 10 and Comparative Example 1.

The quantum yield (QY) of each of the ink compositions (red ink compositions) according to Examples 1 to 5 and Comparative Example 1 was evaluated on the basis of the measured quantum yield (QY). The evaluation criteria were described below. Tables 2 and 3 show the results.

A: 60% or more

B: 50% or more and less than 60%

C: less than 50%

The quantum yield (QY) of each of the ink compositions (green ink compositions) according to Examples 6 to 10 was evaluated on the basis of the measured quantum yield (QY). The evaluation criteria were described below. Table 4 shows the results.

A: 50% or more

B: 40% or more and lower than 50%

C: lower than 40%

TABLE 2

|  |  | Example 1 | Example 2 | Example 3 | Example 4 | Example 5 |
|---|---|---|---|---|---|---|
| Red-light-emitting nanocrystal particle dispersion | | 1 | 1 | 2 | 2 | 3 |
| Light-diffusing particle dispersion | | 1 | 2 | 1 | 3 | 4 |
| First monomer | monofunctional | EOEOA | EOEOA | — | — | — |
| | bifunctional | — | — | HDDMA | HDDMA | DPGDA |
| | trifunctional | — | — | — | — | — |
| Second monomer | monofunctional | — | — | — | — | — |
| | bifunctional | DPGDA | — | DPGDA | — | HDDMA |
| | trifunctional | — | TMETA | — | GTA | — |

TABLE 2-continued

|  | Example 1 | Example 2 | Example 3 | Example 4 | Example 5 |
|---|---|---|---|---|---|
| HSP distance [MPa$^{0.5}$] | 0.9 | 2.0 | 0.4 | 2.1 | 0.4 |
| Rating  EQE | A | A | A | A | A |
| Ejection stability | B | A | A | A | A |
| Curability | A | A | A | A | A |
| QY | A | A | A | A | A |

TABLE 3

|  |  | Comparative example 1 |
|---|---|---|
| Red-light-emitting nanocrystal particle dispersion |  | 1 |
| Light-diffusing particle dispersion |  | 5 |
| First monomer | monofunctional | EOEOA |
|  | bifunctional | — |
|  | trifunctional | — |
| Second monomer | monofunctional | HEA |
|  | bifunctional | — |
|  | trifunctional | — |
| HSP distance [MPa$^{0.5}$] |  | 10.4 |
| Rating | EQE | C |
|  | Ejection stability | A |
|  | Curability | B |
|  | QY | B |

TABLE 4

|  |  | Example 6 | Example 7 | Example 8 | Example 9 | Example 10 |
|---|---|---|---|---|---|---|
| Green-light-emitting nanocrystal particle dispersion |  | 1 | 1 | 2 | 2 | 3 |
| Light-diffusing particle dispersion |  | 1 | 2 | 1 | 3 | 4 |
| First monomer | monofunctional | EOEOA | EOEOA | — | — | — |
|  | bifunctional | — | — | HDDMA | HDDMA | DPGDA |
|  | trifunctional | — | — | — | — | — |
| Second monomer | monofunctional | — | — | — | — | — |
|  | bifunctional | DPGDA | — | DPGDA | — | HDDMA |
|  | trifunctional | — | TMETA | — | GTA | — |
| HSP distance [MPa$^{0.5}$] |  | 0.9 | 2.0 | 0.4 | 2.1 | 0.4 |
| Rating | EQE | A | A | A | A | A |
|  | Ejection stability | A | A | A | A | A |
|  | Curability | A | A | A | A | A |
|  | QY | A | A | A | A | A |

In Tables 2 to 4, the first monomer is the ethylenically unsaturated monomer contained in the light-emitting nanocrystal particle dispersion, and the second monomer is the ethylenically unsaturated monomer contained in the light-diffusing particle dispersion.

INDUSTRIAL APPLICABILITY

An ink composition according to the present invention contains light-emitting nanocrystal particles, light-diffusing particles, and at least two monomers with an ethylenically unsaturated group, wherein the at least two monomers include two monomers with Hansen solubility parameters δd, δp, and δh that satisfy the conditions in particular ranges. Thus, the two monomers have good miscibility with each other, and a pixel unit with improved external quantum efficiency can be formed. Furthermore, an ink composition with high ejection stability and curability can also be provided, for example, by an ink jet recording method.

REFERENCE SIGNS LIST

10 pixel unit, 10a first pixel unit, 10b second pixel unit, 10c third pixel unit, 11a first light-emitting nanocrystal particle, 11b second light-emitting nanocrystal particle, 12a first light-diffusing particle, 12b second light-diffusing particle, 20 light-shielding portion, 30 light conversion layer, 40 substrate, 100 color filter

The invention claimed is:

1. An ink composition comprising:
   light-emitting nanocrystal particles;
   light-diffusing particles;
   a polymer dispersant having a weight average molecular weight of 1,000 or more; and
   two monomers with an ethylenically unsaturated group, each of the two monomers having Hansen solubility parameters δd, δp, and δh that satisfy the following conditions, $16.0 \text{ MPa}^{0.5} \leq \delta d < 18.0 \text{ MPa}^{0.5}$ $2.5 \text{ MPa}^{0.5} \leq \delta p < 5.5 \text{ MPa}^{0.5}$ $2.5 \text{ MPa}^{0.5} \leq \delta h < 8.0 \text{ MPa}^{0.5}$, wherein the ink composition has a surface tension in the range of 20 to 40 mN/m, and
   wherein the ink composition has a viscosity in the range of 5 to 40 mPa·s at 23° C.

2. The ink composition according to claim 1, wherein one of the two monomers that satisfy the conditions has a viscosity in the range of 2 to 40 mPa·s at 23° C., and the other monomer has a viscosity in the range of 5 to 65 mPa·s at 23° C.

3. The ink composition according to claim 1, wherein the two monomers that satisfy the conditions have no vinyl ether group.

4. The ink composition according to claim 1, wherein the light-emitting nanocrystal particles have an organic ligand on their surfaces.

5. The ink composition according to claim 1, further comprising a photopolymerization initiator.

6. The ink composition according to claim 1, wherein the at least two monomers are alkali-insoluble.

7. The ink composition according to claim 1, wherein the ink composition can form an alkali-insoluble coating film.

8. The ink composition according to claim 1, wherein the light-diffusing particles have an average particle size in the range of 0.05 to 1.0 µm.

9. The ink composition according to claim 1, wherein the light-diffusing particles contain at least one selected from the group consisting of titanium oxide, alumina, zirconium oxide, zinc oxide, calcium carbonate, barium sulfate, and barium titanate.

10. The ink composition according to claim 1 for use in a color filter.

11. The ink composition according to claim 1 for use in an ink jet method.

12. A light conversion layer comprising a plurality of pixel units,
wherein the plurality of pixel units have a pixel unit containing a cured product of the ink composition according to claim 1.

13. The light conversion layer according to claim 12, further comprising:
a light-shielding portion between the plurality of pixel units,
wherein the plurality of pixel units contain
a first pixel unit that contains the cured product and contains, as the light-emitting nanocrystal particles, light-emitting nanocrystal particles that absorb light with a wavelength in the range of 420 to 480 nm and emit light with an emission peak wavelength in the range of 605 to 665 nm, and
a second pixel unit that contains the cured product and contains, as the light-emitting nanocrystal particles, light-emitting nanocrystal particles that absorb light with a wavelength in the range of 420 to 480 nm and emit light with an emission peak wavelength in the range of 500 to 560 nm.

14. The light conversion layer according to claim 13, wherein the plurality of pixel units further include a third pixel unit with a light transmittance of 30% or more at a wavelength in the range of 420 to 480 nm.

15. A color filter comprising the light conversion layer according to claim 12.

16. A method for producing the ink composition according to claim 1, comprising the steps of:
preparing a light-emitting nanocrystal particle dispersion that contains light-emitting nanocrystal particles and a first monomer containing one of the two monomers that satisfy the conditions;
preparing a light-diffusing particle dispersion that contains light-diffusing particles and a second monomer containing the other of the two monomers that satisfy the conditions; and
mixing the light-emitting nanocrystal particle dispersion with the light-diffusing particle dispersion.

* * * * *